United States Patent [19]
Muse et al.

[11] Patent Number: 6,005,755
[45] Date of Patent: Dec. 21, 1999

[54] SHUTTER SHELL ENCAPSULATING DISK MEDIUM

[75] Inventors: Jay A. Muse, Centerville, Utah; Brian Schick, San Diego, Calif.; Shane Nowell, Riverdale, Utah

[73] Assignee: Iomega Corporation, Roy, Utah

[21] Appl. No.: 08/968,356

[22] Filed: Nov. 12, 1997

[51] Int. Cl.⁶ .................................................. G11B 23/03
[52] U.S. Cl. ............................................................. 360/133
[58] Field of Search .............................. 360/133; 369/291

[56] References Cited

U.S. PATENT DOCUMENTS

| | | | |
|---|---|---|---|
| Re. 32,876 | 2/1989 | Wakabayashi et al. | 360/133 |
| 4,445,157 | 4/1984 | Takahashi | 360/133 |
| 4,471,397 | 9/1984 | Cloutier | 360/133 |
| 4,553,175 | 11/1985 | Baumeister | 358/310 |
| 4,586,102 | 4/1986 | Bresson | 360/133 |
| 4,652,961 | 3/1987 | Dieffenbach | 360/133 |
| 5,278,717 | 1/1994 | Sasaki et al. | 360/133 |
| 5,381,402 | 1/1995 | Lee et al. | 369/291 |
| 5,469,314 | 11/1995 | Morehouse et al. | 360/105 |
| 5,481,420 | 1/1996 | Cardona et al. | 360/133 |
| 5,636,095 | 6/1997 | McGrath et al. | 360/133 |

FOREIGN PATENT DOCUMENTS

| | | |
|---|---|---|
| 2 228 818 | 9/1990 | United Kingdom . |
| WO 88/09553 | 12/1988 | WIPO . |
| WO 89/08312 | 9/1989 | WIPO . |

*Primary Examiner*—Craig A. Renner
*Attorney, Agent, or Firm*—Woodcock Washburn Kurtz Mackiewicz & Norris LLP

[57] ABSTRACT

A disk cartridge has two shell layers. The first layer encases the disk medium. The second layer encases the first layer. Both layers have a head access opening such that rotation of one layer relative to the other layer causes the head access openings to be aligned or misaligned. When the head access openings are misaligned the cartridge is closed. When the head access openings are aligned the cartridge is open.

6 Claims, 22 Drawing Sheets

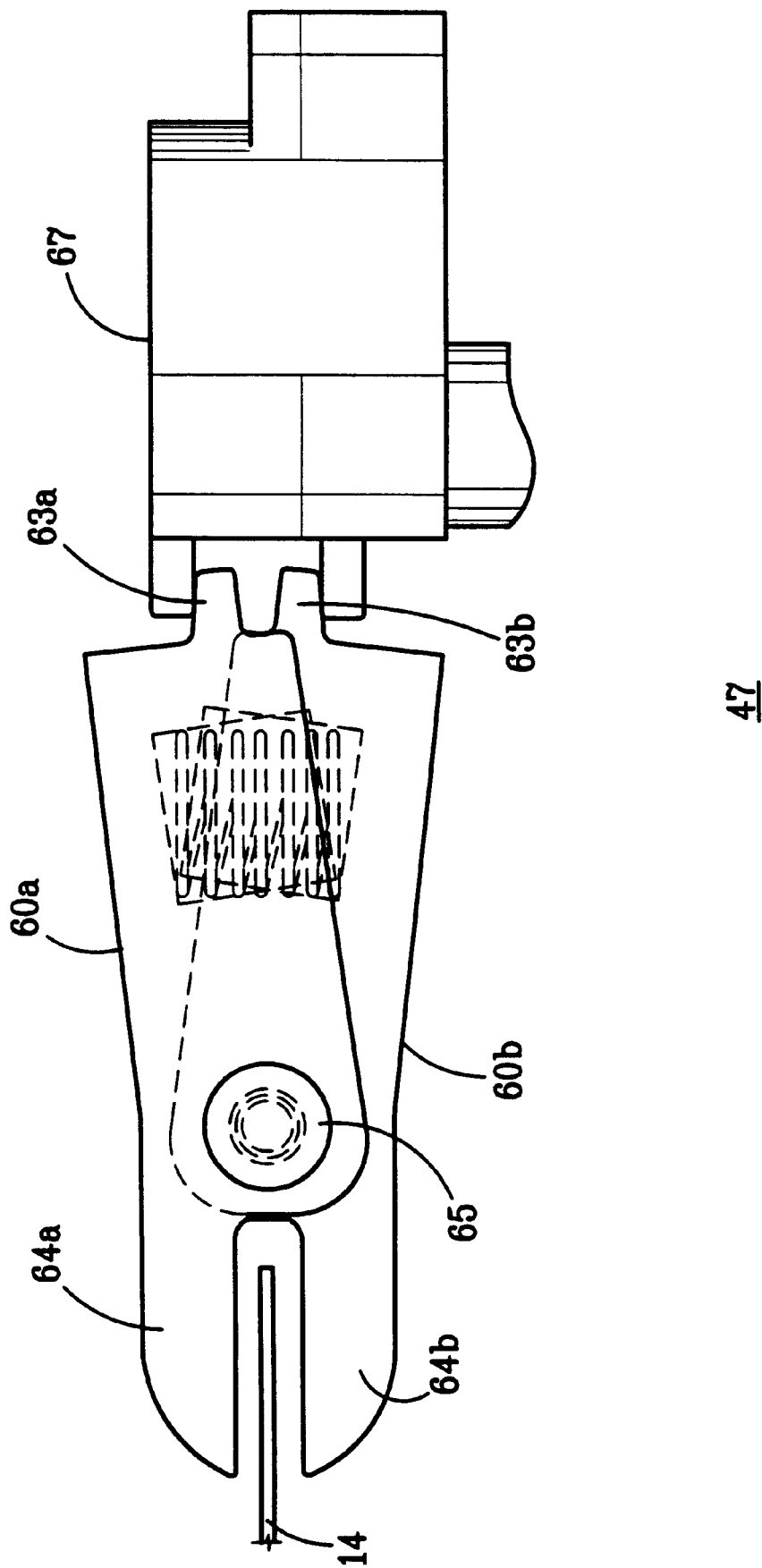

SHUTTER SHELL ENCAPSULATING DISK MEDIUM

BACKGROUND OF THE INVENTION

This invention relates to a cartridge based data storage system in which a flexible magnetic disk is disposed within a cartridge shell. More particularly, the invention relates to a double shelled cartridge for controlling access to the disk media.

Microprocessors and supporting computer technologies are rapidly increasing in speed and computing power while decreasing in cost and size. These factors have led to the broad application of microprocessors to an array of electronic products, such as hand-held computers, digital cameras, cellular phones and the like. All of these devices have, in effect, become computers with particular application-specific attributes. For this new breed of computer products, enormous flexibility is gained by the ability to exchange data files and store computer software.

A variety of proprietary storage devices have been used in computer products. For example, hand-held computers have used integrated circuit memory cards ("memory cards") as the primary information storage media. Memory cards include memory storage elements, such as static random access memory (SRAM), or programmable and erasable non-volatile memory, such as "flash" memory. Memory cards each are typically the size of a conventional credit card and are used in portable computers in place of hard disk drives and floppy disk drives. Furthermore, memory cards enhance the significant advantages of the size, weight, and battery lifetime attributes of the portable computer and increase portability of the storage media. However, because of the limited memory density attainable in each memory card and the high cost of the specialized memory chips, using memory cards in hand-held computers imposes limitations not encountered in less portable computers, which typically use more power-consuming and heavier hard and floppy disk drives as their primary storage media.

Other of these computer products, such as the digital camera, have employed miniature video disks as the storage media. For example, U.S. Pat. No. 4,553,175 issued Nov. 12, 1985 to Baumeister discloses a digital camera configured to store information on a magnetic disk. In Baumeister, a signal processor receives signals representative of a picture from a photo sensor. Those signals are recorded on a magnetic disk for later processing. Unfortunately, the video disk storage product provides limited storage capacity. For that and other reasons (e.g., power consumption and cost), the video disk has not been used in other computer products. As a result, interchanging data from one of these digital cameras with other computer products, such as a hand-held computer, is not readily achieved.

Miniature hard disk drives have also been suggested for use in portable computer products. For example, U.S. Pat. No. 5,469,314 issued Nov. 21, 1995 to Morehouse et al. discloses a miniature hard drive for use in portable computer applications. In Morehouse, a hard disk drive is described that is approximately 50 mm in diameter. While addressing many of the problems presented by storage requirements in portable computers, the obvious problem of removability of the storage media is still present.

Similar to a standard size cartridge, the miniature cartridge contains a flexible magnetic disk disposed within a hard outer shell. Such a standard size cartridge is disclosed in U.S. Pat. No. 4,445,157 (Takahashi). The Takahashi patent is generally directed to a disk cassette that contains a flexible magnetic disk having a center core (i.e., a hub) and an apparatus for reading and recording information on the flexible magnetic disk. The disk cassette comprises a flexible disk attached to a hub. The disk and hub assembly are sandwiched between an upper cover and a lower cover. The shutter slides over the outside of the cartridge to cover a head access opening.

A similar standard size cartridge is disclosed in U.S. Pat. No. Re, 32,876 (Wakabayashi et al.). The Wakabayashi patent is also generally directed to a disk cassette that contains a flexible magnetic disk having a center core (i.e., a hub) and for storing information. The disk cassette comprises a flexible disk attached to a hub. The disk and hub assembly are sandwiched between an upper cover and a lower cover. The Wakabayashi shutter rotates on the interior of the cartridge and comprises a metal sheet that slides over a disk access opening to cover a head access opening. This interior shutter works okay for disk that have low revolution speed in which aero dynamics of the disk are not an issue. However, in a cartridge wherein the disk rotates at relatively high velocities, the shutter could change the aerodynamics of the disk rotation and effect performance.

Thus, there is a need for an improved shutter mechanism.

SUMMARY OF THE INVENTION

In accordance with the present invention a mini-cartridge is provided for mini drives in a plurality of hand-held devices which generate signals representing different functions performed by different classes of the devices. For example, the devices include digital cameras, electronic books, global positioning systems, personal digital systems, portable games and cellular phones. Each of these devices has a mini drive for writing signals and reading signals representing the functions to and from a magnetic medium in the mini-cartridge. In this way, signals representing the diverse functions performed by the different classes of devices are recorded on the mini-cartridge. The hand-held devices incorporating the present invention provide and create a single means of capturing, moving and storing information across multiple products.

The present invention is directed to a data storage device that comprises a disk drive and removable cartridge. The cartridge for use with the drive comprises an outer shell having a spindle access opening, a substantially circular magnetic medium rotatably disposed within the outer shell, and a hub connected to the magnetic medium proximate the center of the medium. The cartridge also comprises an inner shell having a spindle access opening and a head access opening. The inner shell is rotatably coupled to the outer shell between first and second positions, and the spindle access openings of the inner and outer shells are substantially aligned. The inner shell is selectively rotatable to the first position so that the head access openings of the inner and outer shells substantially align and the second position so that the head access openings are substantially misaligned. The circular medium is rotatably disposed within the inner shell.

The inner shell preferably comprises upper and lower inner shell halves having raised outer edges. The two shell halves are brought together so that their edges overlap in frictional engagement to form a single inner shell. The inner shell is substantially disc shape and has a hollow interior wherein the disk media is rotatably disposed. The disk access opening in the outer shell and the inner shell are substantially wedge shaped. The inner shell comprises a sheet metal, preferably aluminum.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 15C shows the arms closed after media is fully inserted into the drive;

DETAILED DESCRIPTION OF PREFERRED EMBODIMENT

The present invention provides a data storage cartridge for use with a removable media type of disk drive. Throughout the description, a preferred embodiment of the invention is described in connection with a particular sized and shaped disk cartridge. However, the disk cartridge dimensions and shape are presented for exemplary purposes only. Accordingly, the mechanism should not be limited to the particular cartridge embodiment shown as the invention contemplates the application to other cartridge and drive types and configurations.

Figure 1:
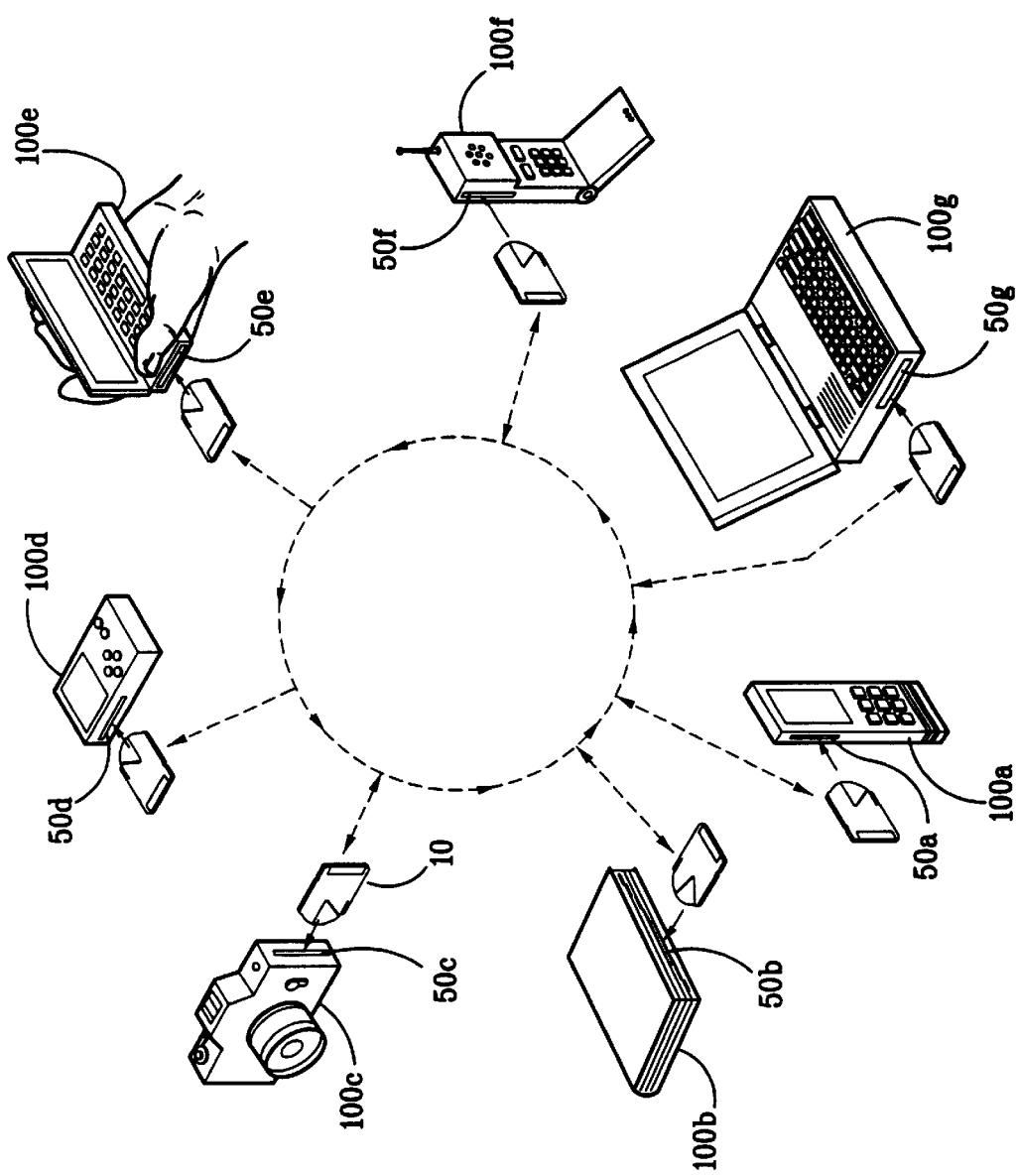
FIG. 1 is a diagram of the interchangeable mini-cartridge of the present invention, including a plurality of devices each having a mini disk drive, and including a caddy to adapt the mini-cartridge to a full-size drive of a host computer.

FIG. 1 shows a plurality of devices 100a–100g, hereinafter collectively designated as devices 100 which generate signals representing different functions performed by different classes of the devices. For example, the global positioning system 100a can generate signals representing navigational position. Electronic book 100b, digital camera 100c, personal digital assistant (PDA/ Palmtop) 100d, portable game 100e, cellular phone 100f, and laptop computer 100g each generate signals representing the function performed by that particular device. Each of these devices has a miniature disk drive 50 for writing the signals and reading the signals from a magnetic recording medium so that diverse functions performed by different classes are recorded on the devices, i.e. a drive 50a for global positioning system 100a, a drive 50b for electronic book 100 b, a drive 50c for digital camera 100c, a drive 50d for PDA/palmtop 100d, a drive 50e for portable game 100e, a drive 50f for cellular phone 100f, and a drive 50g for laptop computer 100g.

A mini-cartridge 10 has a magnetic recording medium on which the signals from the devices are recorded. Mini-cartridge 10 is compatible with the mini drives 50. Standard file formats maintain compatibility between devices 100. In the preferred embodiment, drives 50 are sized to fit within a PCMCIA form factor, preferably PCMCIA type II or type III, more preferably type II. These form factors is commonly used in portable personal computers. For example, PCMCIA type II form factor is commonly used for a modem connection of a notebook computer. PCMCIA type II form factor is quite small so that miniature drive 50 readily fits into all of the portable, hand-held devices shown in FIG. 1. The miniature drive 50 is insertable into and removable from the device just as the PCMCIA modem is insertable into and removable from the PCMCIA slot of a notebook computer. Alternatively, the drive 50 could be hard wired, i.e., built-in, to the device. In both cases, the device generates a digital function signal which is connected to the magnetic heads of the drive so that the digital function signal can be written on the magnetic medium of miniature cartridge 10. As an example, a digital function signal representing a picture taken in a digital camera 100c is recorded on a cartridge 10. This digital function signal can then be read by other classes of devices when the cartridge 10 is inserted into the respective other device.

Figure 2:
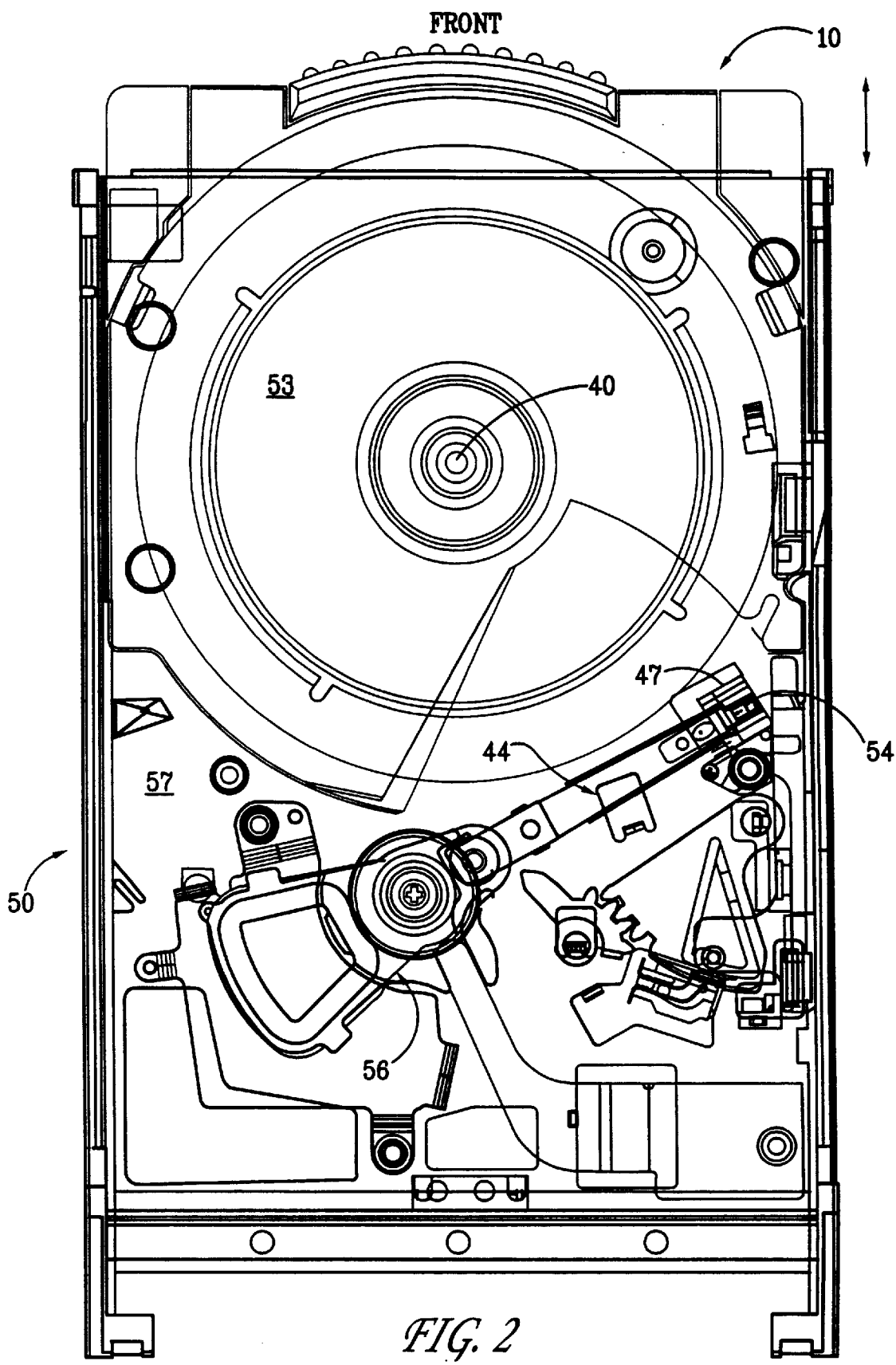
FIG. 2 is a top plan view of a disk drive according to the present invention.
Figure 3:
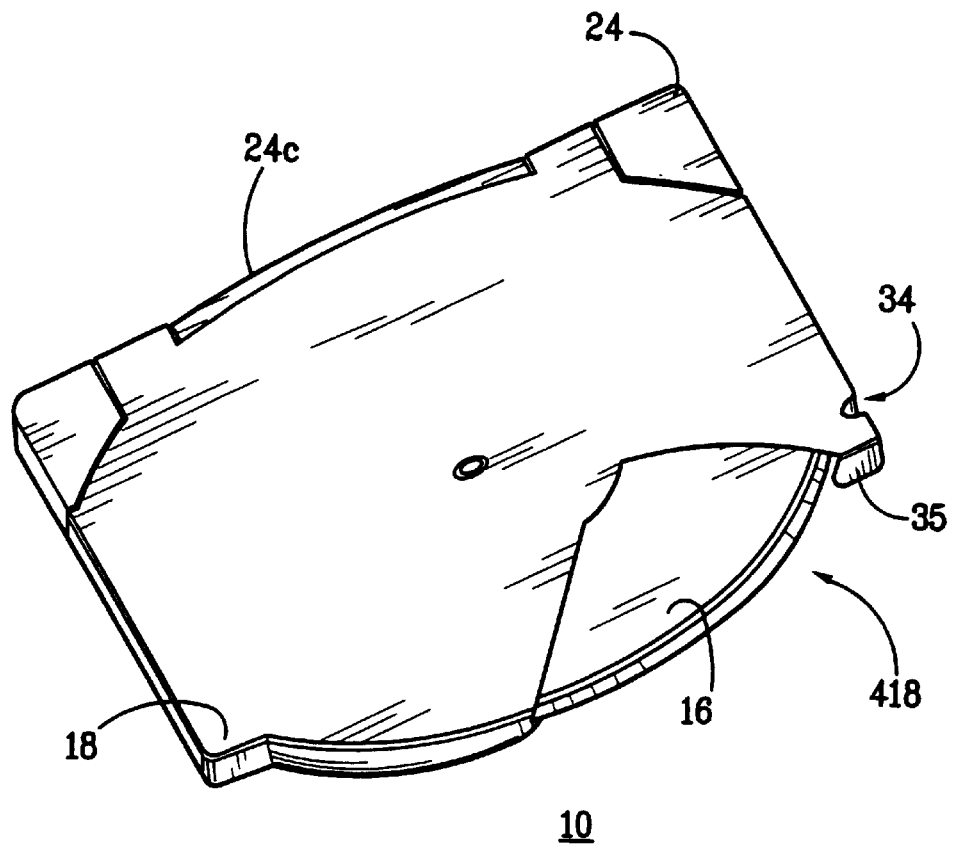
FIG. 3 is an isometric view of a cartridge for use with the drive of FIG. 1.

FIG. 2 is a top view of a disk drive 50 with its top cover removed for clarity. Drive 50 accepts a removable disk cartridge 10 (shown in phantom) for reading and storing digital information. Drive 50 comprises a chassis 57, an actuator 56 (preferably a rotary actuator), including an opposing pair of load beams 44 having a read/write head 54 disposed at the end of each load beam, a load ramp 47, a spindle motor 53 and a spindle 40, and a shutter opening arm (not shown). The operation of disk mounting to spindle 40 is described more fully below. A disk cartridge 10 can be inserted into the front of the drive in the direction indicated by the arrow. During insertion, cartridge 10 slides linearly along the top surface of chassis 57 and spindle motor 53 for engagement with the read/write heads 54.

Figure 4:
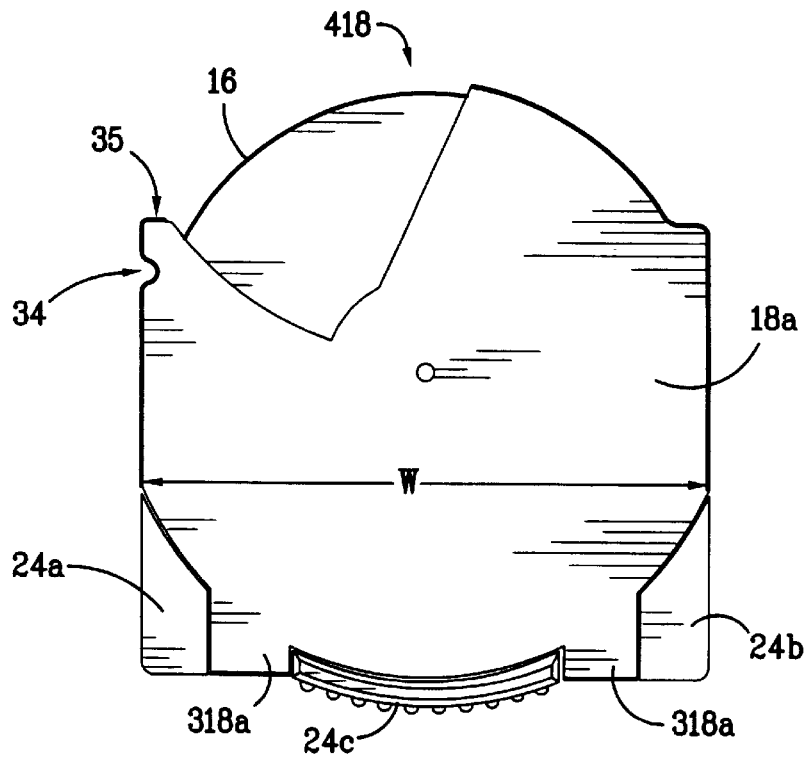
FIG. 4 is a top plan view of the cartridge of FIG. 2.
Figure 5:
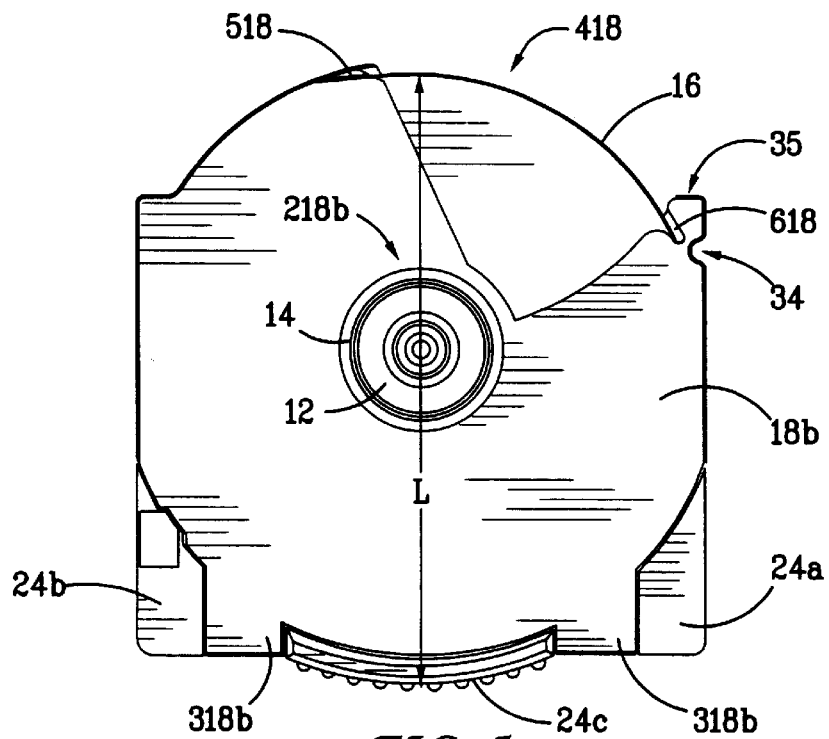
FIG. 5 is a bottom plan view of the cartridge of FIG. 2.

FIGS. 3–6 are isometric, top plan, bottom plan, and side elevation views of a miniature disk cartridge 10 that embodies aspects of the present invention. Miniature disk cartridge 10 has a number of differences from a full-size cartridges, such as the well-known 1.44 megabyte 3.5" floppy disk cartridge and the well-known ZIP disk cartridge) that prevent the miniature disk cartridge 10 from operating directly in a full-size drive. Perhaps, the most obvious of these differences is size. Disk cartridge 10 has a much smaller form factor than a full-size drive cartridge. Whereas a full size drive cartridge is about 4" square and ¼" high, a mini-cartridge less than about 2" wide square and about 1/10" high. In particular, disk cartridge 10 has a width w preferably in a range of about 49 (1.9") to 51 mm (2"), most preferably about 50.1 mm, a length about 50 to 52.5 mm long, preferably about 51.8 mm, and a thickness h less than about 2 mm (about 1/10") thick, most preferably 1.95 mm. A large wedged shaped disk access opening 418 is disposed in the front portion of disk cartridge 10 to provide selective access to the media of cartridge 10. Disk cartridge 10 comprises a flexible magnetic disk 14 (partially shown in FIG. 5) and a disk media hub 12. A driving access hole 218 provides an opening in cartridge 10 for drive spindle 40 (see FIG. 2) to engage hub 12 and drive flexible disk 14 past opposing read write heads 54 (also shown in FIG. 2). Hub 12 is sized slightly smaller than driving hole 218b, and as best shown in FIG. 4, hub 12 projects downwardly from cartridge 10. Cartridge 10 also has a side cut-out 34 and abutment surface 35. As explained more fully below, cut-out 34 and abutment surface 35 engage a sliding lever during cartridge insertion and ejection. Cut-out 34 functions to retain cartridge 10 in drive 50 and ensure proper cartridge insertion while abutment surface 35 provides a flat surface for engagement and spring loading of sliding lever.

Figure 7:
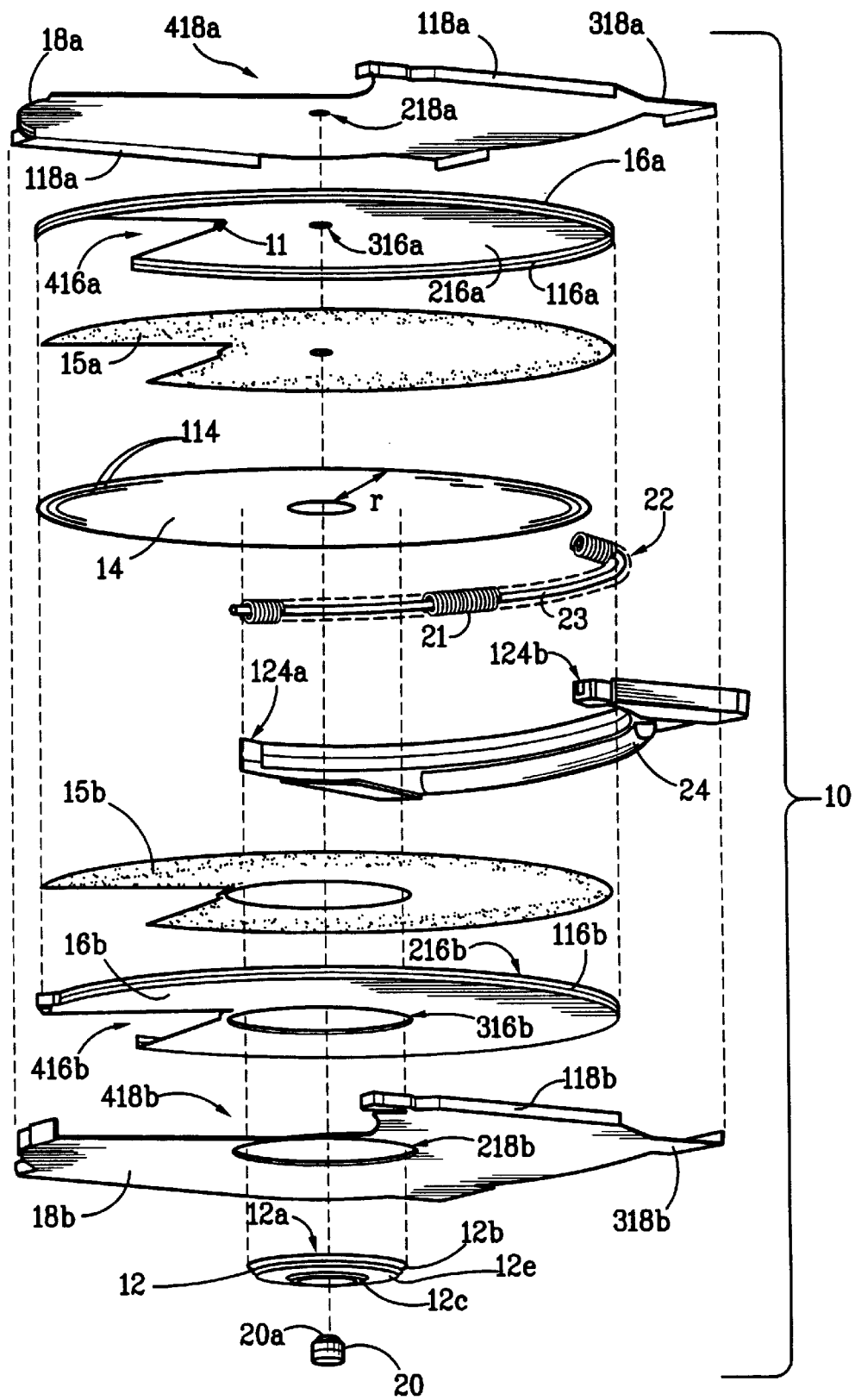
FIG. 7 is an exploded view of the cartridge of FIG. 2.

Referring also to FIG. 7, an exploded view of cartridge 10 is provided to more clearly show cartridge 10 interior components. Cartridge 10 comprises top and bottom cartridge shell halves 18a and 18b, respectively, a rotary shutter shell having upper and lower halves 16a and 16b, respectively, upper and lower shutter shell liners 15a and 15b, respectively, a shutter pivot post 20, a shutter spring mechanism 22, and a shell stabilizer 24.

Cartridge 10 is about half the thickness of the well-known 3.5 inch floppy disk. As a result convention removable cartridge shell materials cannot be used to construct cartridge 10. Plastics, such as those used in the well-known 3.5 inch floppy disk, would either be too thick or not strong enough if manufactured with the desired thickness. To manufacture a thin cartridge, such as cartridge 10, all of the component materials must be as thin as possible while providing structural support that will withstand the rigors of everyday use. For example, cartridge shell halves 18a and 18b are formed from a thin sheet material preferably about 0.1854 mm thick. To provide the structural support, the shell is preferably made from a sheet metal. Preferably the metal is sheet steel, more preferably stainless steel, and most preferably series 300 stainless steel. Cartridge shell halves 18a and 18b are preferably cut from a sheet of steel in a stamping operation which forms the turned edge portions 118a and 118b, provides the cutouts such as the driving hole 218b in the bottom cartridge shell half 18b, post hole 218a in the top cartridge shell half 18a, media access openings 418a, 418b, and so on.

Shutter shell halves also must meet strict thickness requirements. As such, shutter shell 16a and 16b are formed from a thin sheet material. The sheet material is preferably a sheet metal. The sheet metal is preferably thin sheet aluminum, preferably 5052 aluminum, more preferably in a half-hard condition. The sheet aluminum is preferably about 0.1854 mm thick. Shutter shell halves are also preferably cut from a sheet of aluminum in a stamping operation which forms upstanding rim 116a in top shutter shell half 16a, upstanding rim 116b in the bottom shutter shell half 16b, and cuts driving hole 316b in the bottom of shutter shell half 16b, pivot hole 316a in the top shutter shell half 16a, and media access openings 416a, 416b in shutter shell halves 16a and 16b.

Upper shutter shell half 16a has a media distortion neutralizer 11 disposed on the inner surface 216a of shutter shell half 16a. Distortion neutralizer 11 is located proximate the apex region of wedge shaped opening 416a. As described in further detail below, distortion neutralizer aids the planarity of media 14 as it approaches head load ramps during disk cartridge 10 insertion into drive 50. Distortion neutralizer provides a raised surface on upper shutter half 16a. Preferably the distortion neutralizer is formed directly on the surface of shutter half 16a, but could also be formed as a separate piece and attached by glue, welding, or the like.

Liners 15a and 15b are attached to shutter shell halves 16a and 16b. Liner 15a is attached to inside surface 216a of shutter shell half 16a; whereas liner 15b is attached to inside surface 216b of shutter shell half 16b. As described in detail below, disk media 14 rotates within the shutter shell and not the cartridge shell. Accordingly, unlike other known cartridges wherein the liners are typically attached to the inside of the cartridge shell, liners 15a, 15b are attached to the inside surface of shutter shells 16a, 16b. Liners 15a and 15b are preferably attached via an adhesive, more preferably a pressure sensitive adhesive. Liners 15a and 15b are cut to the shape of the surface to which they will be attached (i.e., 216a, 216b ) from a sheet of liner material. The liner material is preferably 100% polyester, more preferably Veratec 141–620 available from Data Resources Group in Walpole Mass. The liner material has a thickness preferably in the range of about 3.35 mils to about 3.8 mils, more preferably about 3.35 mils.

Stabilizer 24 is a substantially U-shaped spacer positioned in the rear portion of cartridge 10 and between upper and lower cartridge shell halves 18a and 18b. Rear cartridge shell tabs 318a and 318b extend rearwardly from upper and lower shell halves 18a and 18b and wrap around stabilizer 24. Therefore, when cartridge 10 is assembled, a portion of stabilizer 24 extends into and between the shell halves 18a and 18b and portions of stabilizer 24 protrude from joined upper and lower shell halves 18a and 18b. The protruding portions of stabilizer 24 form portions of the outer contours of cartridge 10. In particular, stabilizer 24 forms cartridge rear corners 24a and 24b and forms rear portion 24c.

Stabilizer 24 is formed of a lightweight rigid material such as plastic. More preferably, stabilizer 24 is formed of high impact polystyrene. It is formed from any one of the well-known plastic forming processes, such as injection molding. Stabilizer 24 provides dimensional stability and rigidity to cartridge 10, thereby minimizing cartridge deformation during mishandling, twisting, and so on.

Shutter spring mechanism 22 comprises a guide wire 23 and a round helical compression spring 21 that is slid over guide wire 23. Shutter spring mechanism 22 is fixed to stabilizer 24 at the ends of guide wire 23. The ends seat in channels 124a and 124b that are formed into the ends of U-shaped stabilizer 24. The operational details of shutter spring mechanism 24 are described in further detail below in connection with the description of cartridge opening and closing.

Flexible magnetic disk 14 is formed of a thin polymer film, such as MYLAR, and has a thin magnetic layer uniformly dispersed on the top and bottom surfaces thereof. The magnetic layer makes the flexible disk 14 susceptible to magnetic flux and enables the storage of digital data when the disk surface is brought into magnetic communication with a magnetic transducer of the type commonly found in disk drives. Disk 14 is generally circular with a circular hole proximate the center of disk 14. Disk 14 has a radius in a range of about 20 to 25 mm, and preferably about 23.25 mm. Disk 14 has concentric tracks 114 that provide the formatting of disk 14 to store digital information. Disk 14 contains a high density of tracks per inch (TPI), preferably in a range of about 2900 to about 3100 TPI, more preferably disk 14 contains about 3050 TPI. This high track density, which incidentally is much high that the common 1.44 megabyte floppy TPI of about 10 TPI, allows the relatively small disk 14 to store at least 40 megabytes of digital data.

Media hub 12 is essentially donut shaped and comprises a ferrous material such as steel, preferably stainless steel. The surface finish is about 8 micro inches to reduce sliding friction. Hub 12 comprises a bore or hole 12a proximate the center, peripheral outer edge 12b and inner ring surface 12c. Inner ring 12c has an outer angled edge and a substantially flat bottom surface. Outer peripheral edge 12b is also angled. Media hub 12 is firmly secured to disk 14 such that the center of hub 12 is aligned proximate the center of disk 14. Media hub 12 is preferably attached to disk 14 via a well-known adhesive process. The disk and hub assembly are rotatably disposed between upper and lower cartridge shutter shell halves 16a, 16b. Hub 12 is disposed in spindle access hole 316b of lower shutter shell 16b and spindle access hole 218b of lower cartridge shell 18b. As described in further detail below, the protrusion of hub 12 from shutter shell 16 and an cartridge shell 18 enhances coupling to a rotational power source, such as that provided by a drive spindle, when cartridge 10 is within drive 50 and acts a restraint on lateral movement of disk 14 when the cartridge is removed drive 50.

Figure 8:
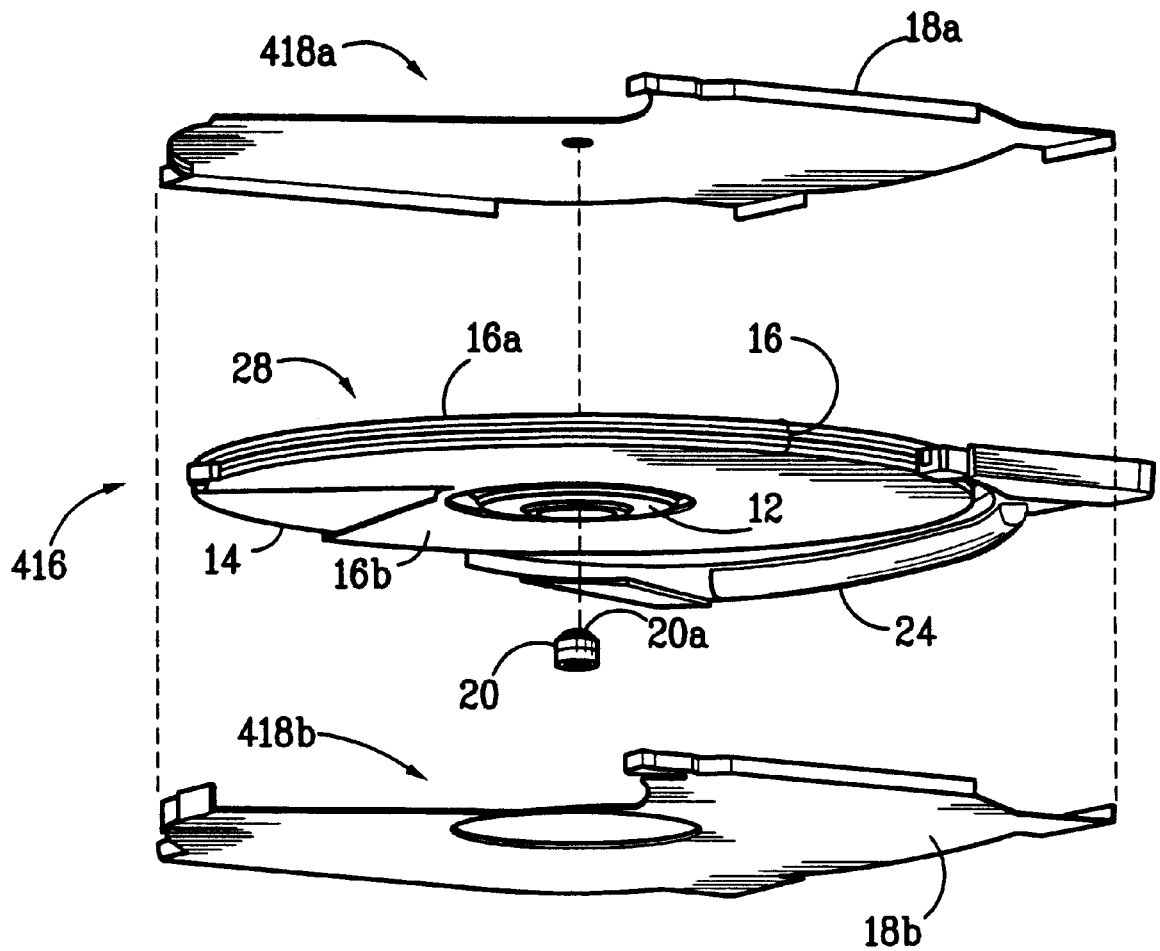
FIG. 8 is a partially exploded view of the cartridge of FIG. 2 showing an internal shutter shell subsystem.

As shown by FIGS. 7 and 8, shutter halves 16a and 16b snap together to form shutter shell 16, which houses media 14 and shutter liners 15a and 15b (not shown in FIG. 5) which are attached to the inner surfaces of shutter shells 16a and 16b respectively. The complete shutter assembly 28 is pivotally attached to top shell 18. Hub 12 is attached to media 14 and protrudes through drive access hole 316b in shutter shell 16b. Accordingly, when cartridge 10 is inserted and operating in drive 50, media 14 rotates within shutter shell 16. As best appreciated from Figure unlike other disk cartridges which do not rotate within the shutter but which rotate within cartridge shell 18. Pivot post 20 attaches shutter assembly 28 to upper shell half 18a by attaching the top portion 20 to pivot hole 218b via shutter pivot hole 316. Pivot post 20 is fixedly attached to top shell cartridge 18a while leaving an offset space between and around post portion 20a and shutter pivot hole 316a.

The use of an internal shutter shell provides several advantages over other internal shutter designs. Among the advantages are improved cartridge 10 rigidity, improved disk 14 aerodynamics, and improved shutter control. The improved rigidity results from cartridge 10 having two layers of shell material (shutter 16 and shell 18) to guard against mishandling. The improved disk 14 aerodynamics result from the fact that space within which disk 14 rotates is completely controlled and free of disturbances caused by other internal mechanical features. For example, in other internal shutter designs, the retracted shutter only covers a portion of the spinning disk thereby increasing the likelihood of air flow disturbances. The final example of the benefits of shutter 16 of the present invention is improved shutter opening control. Shutters typically have a biasing mechanism to close the shutter. In the present shutter design, a spring 21 provides such a bias. Here, spring 21 can be located in the rear of the cartridge 10 and still control the operation of shutter 16.

When shutter assembly 28 is complete, media 14 is exposed at media access opening 416. However, and as described more fully below, media 14 within cartridge 10 is only accessible from outside of cartridge 10 when shutter access opening 416 aligns with cartridge shell access opening 418. In such an alignment, shutter shell 16 moves to a first position so that the openings 416, 418 completely overlap thereby "opening" cartridge 10. When the cartridge shell access opening 416 and cartridge shell access opening 418 are misaligned, shutter shell 16 moves to a second position such that the openings 416, 418 do not over lap thereby "closing" cartridge 10, shielding media 14 from ambient contaminants.

Figure 6:
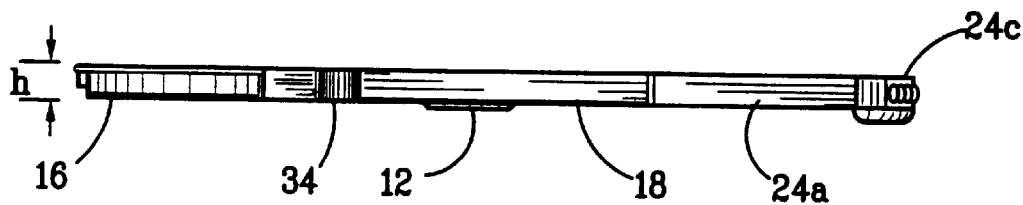
FIG. 6 is a side elevation view of the cartridge of FIG. 2.
Figure 9:
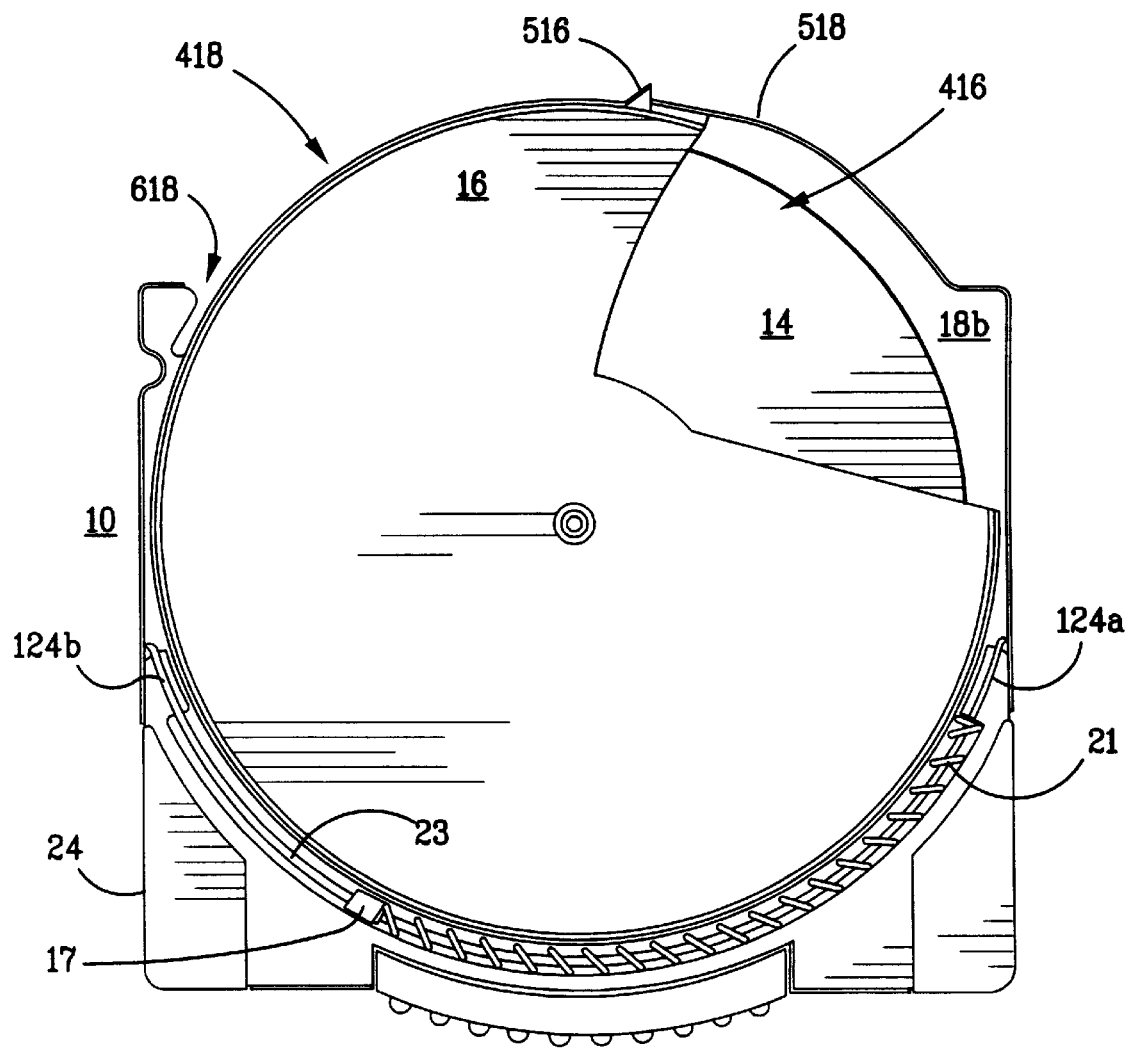
FIG. 9 is a top plan view of the cartridge of FIG. 2 with the upper shell half removed to reveal the operation of the shutter shell.
Figure 10:
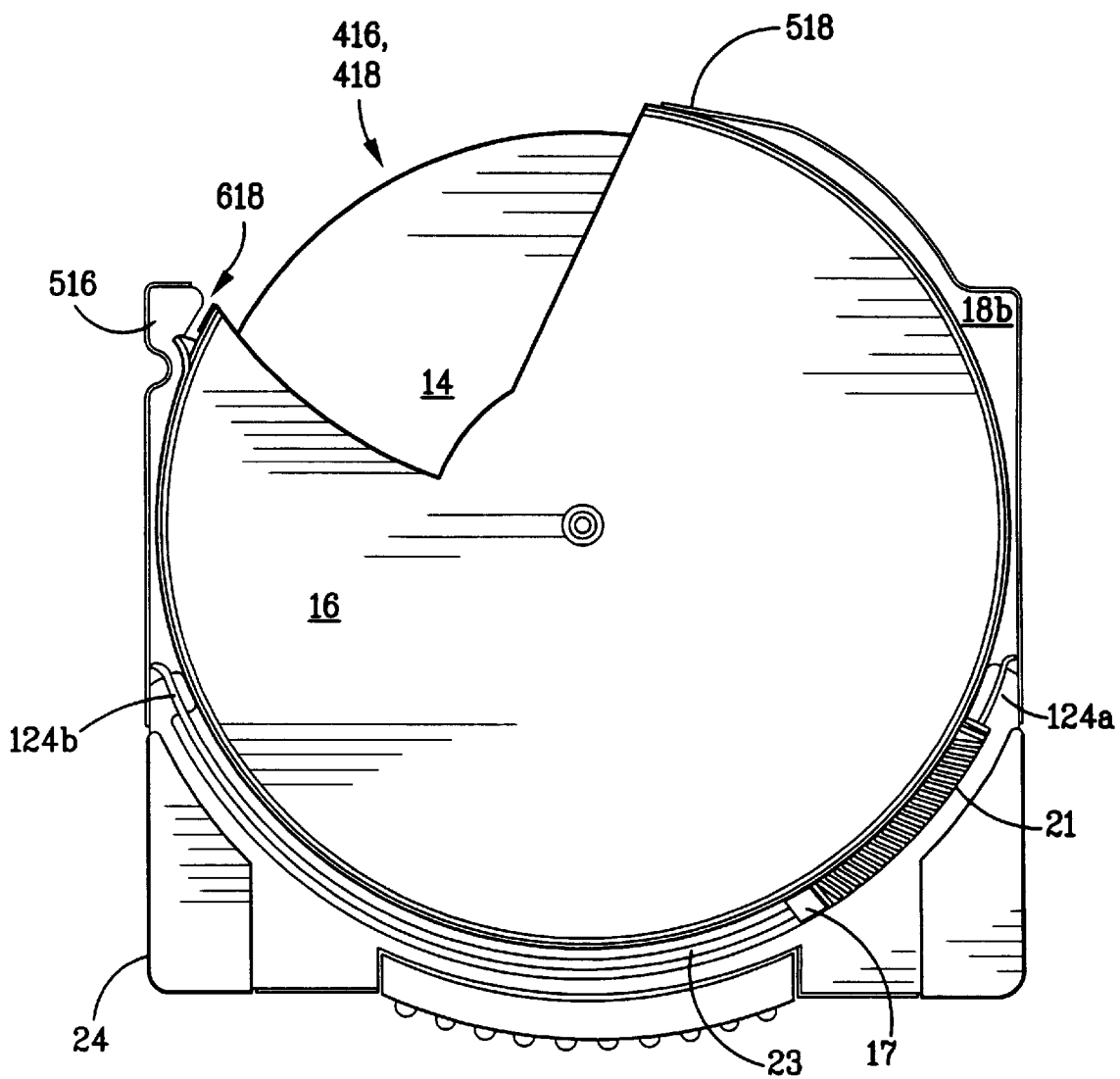
FIG. 10 is another top plan view of the cartridge of FIG. 2 with the upper shell half removed to reveal the operation of the shutter shell.

FIGS. 9 and 10 illustrate the "opening" and "closing" operation of shutter shell 16 with spring mechanism 22. FIG. 6 is a top plan view of cartridge 10 in the closed position with upper cartridge shell 18a removed for clarity. FIG. 7 is a top plan view of cartridge 10 in the open also with upper cartridge shell 18a removed for clarity. The motive force for biasing shutter 16 toward the closed position is provided by compression spring 21 in an arcuate path. As noted above, compression spring 21 is slid over arcuate guide wire 23, which is attached to the ends of U-shaped stabilizer 24 in slots 124a and 124b. After attachment of compression spring 21 onto guide wire 23, spring 21 follows the arcuate path established by guide wire 23. Other structures are possible for forming an arcuate spring path. For example, an arcuate channel cut into the stabilizer 24 would also provide an arcuate path for spring 21. However, the use of guide wire 23 is preferred because it facilitates construction of cartridge 10 by improving the handling of spring 21. That is, spring 21 easily conform to the shape of wire 23 which is then attached to stabilizer 24.

Shutter shell 16 has an extending tab 17 that couples an translates a force between shutter 16 and spring 21. Tab 17 is preferably formed into shutter 16 but could alternately be attached to shutter shell 16 as a separate part such as by welding. Tab 17 extends outwardly from shutter shell 16 so as to extend into the spring path, overlapping guide wire 23. When cartridge 10 is in the closed position, compression spring 21 engages tab 17 biasing shutter 16 toward the closed position. To open cartridge 10, a counterclockwise rotational force is applied to shutter shell 16 (from the perspective of FIGS. 6 and 7) against the bias of spring 21, thereby compressing spring 21. When the rotational force is removed from shutter shell 16, spring 21 biases shutter shell 16 back to the closed position.

Cartridge 10 has several features (best described with respect to FIGS. 9 and 10) that cooperate in the operation of shutter 16 in conjunction with drive 50. These features include, catch feature 516, flat nose portion 518, and retraction slot 618 (see FIG. 5 for an alternate view of retraction slot 618).

Shutter catch feature 516 protrudes outwardly from the radius of shell 16. Catch feature 516 provides two significant functions in the operation of shutter 16: first, it provides a stop when spring 21 biases shutter 16 toward the closed position; and second, it provides a mechanism for coupling with drive 50 so that shutter 16 can be opened during insertion into drive 50. The stop function of catch 16 operates when shutter 16 rotates toward the clockwise direction. When rotated to the closed position, catch 516 engages the cartridge shell edge and thereby stops the rotation of shell 16.

Figure 11A:
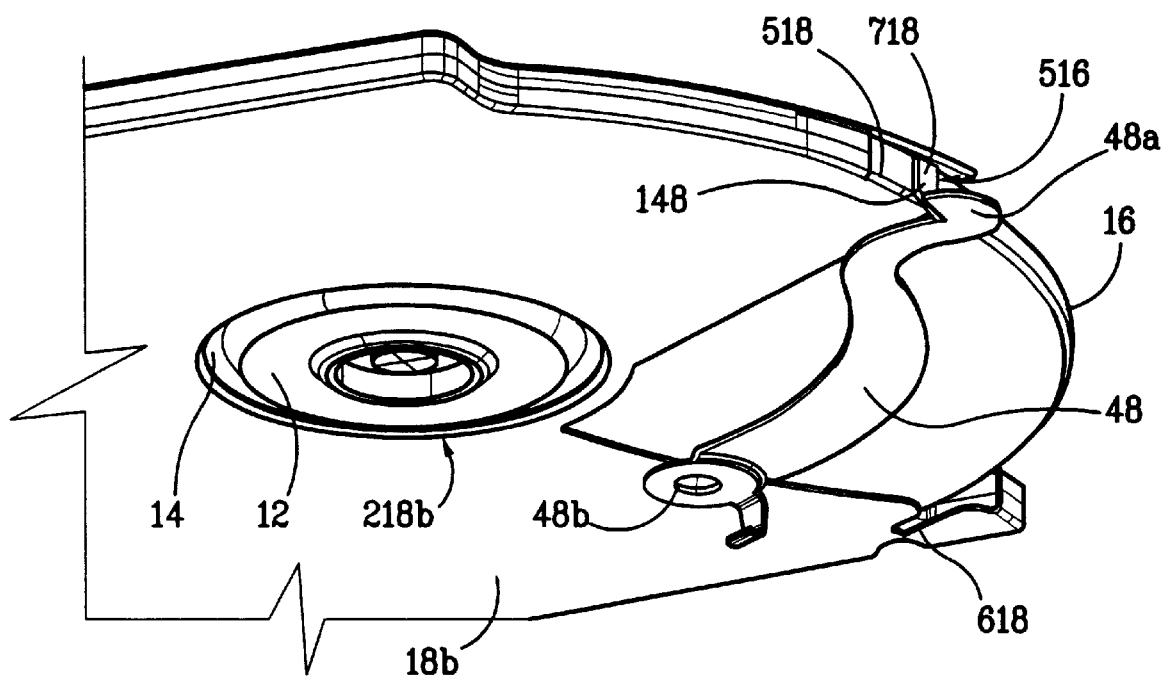
FIG. 11A–11E are illustration of the operation of shutter shell 16 in conjunction with the drive of FIG. 2.

Referring to FIG. 11A–11E, the operation of shutter shell 16 with drive 50 is further illustrated. Referring to FIG. 11A, cartridge shell 18 also has a flat nose portion 518 which is adjacent to catch feature 516 when shutter shell 16 is in the closed position. Upper cartridge shell 18a has an overhang 718, proximate flat nose portion 518, that shields catch 516 when the cartridge is not in drive 50. Shutter 16 is opened by shutter lever 48. Shutter lever 48 has a hook like portion 48a on its proximal end. Hook like portion 48a has an upstanding tab portion 148 that is adapted to engage shutter shell 16. When a cartridge 10 is inserted into drive 50, upstanding tab 148 engages flat nose portion 518. The relatively flat and wide upstanding tab 148 and flat nose portion 518 provide sufficient area to ensure that lever 48 properly and reliably engages shutter 16. Additionally, flat nose portion 518 enhances the pressure angle to more easily begin the rotation of shutter 16. When properly engaged, an edge of upstanding tab 148 mates with catch 516.

Figure 11B:
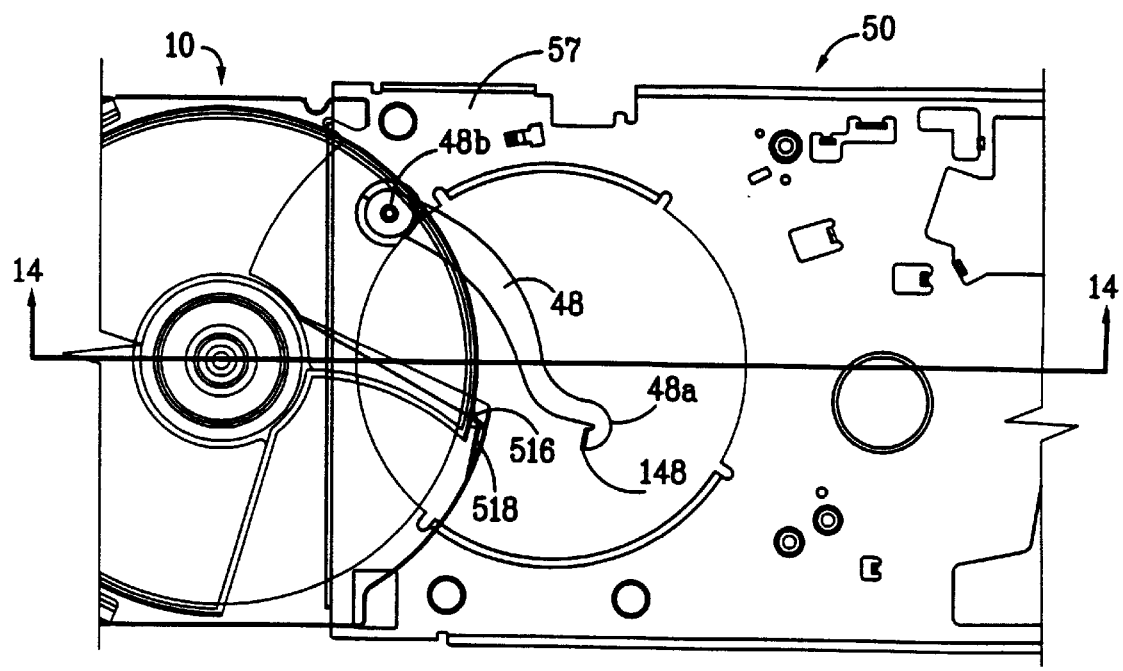

A retraction slot 618 is cut into the lower cartridge shell 18b. Retraction slot 618 permits the upstanding tab to retract, along with catch 516, into cartridge shell 18 and move out of the way of the other drive 50 components. This ability to retract the shutter opening mechanism and catch 516 results in a larger disk access opening. FIG. 11E illustrates cartridge 10 loaded fully into drive 50 with lever 48 and shutter shell 16 fully retracted.

Shutter lever 48 is pivotally mounted at its distal end 48b to drive chassis 57 proximate the front portion of drive 50. Shutter lever 48 is biased by a spring (not shown) in a clockwise direction (as viewed in FIGS. 11B–11E). As a result of the bias, lever 48 pivots to a positioned proximately as shown in FIG. 11B when a cartridge 10 is absent from drive 11.

Figure 11C:
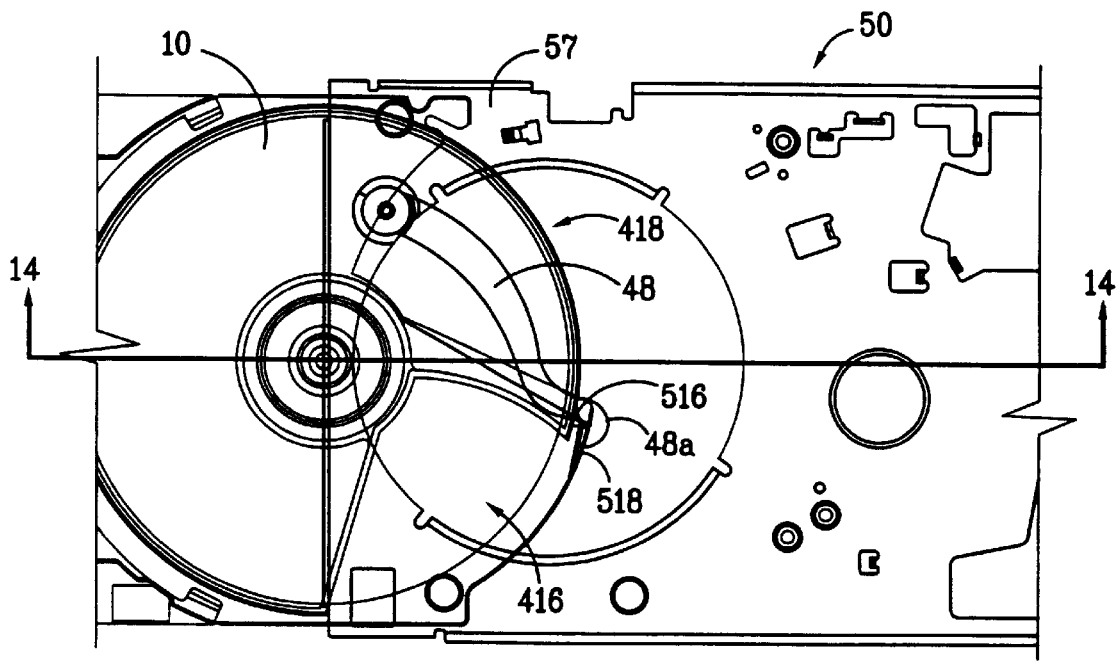
Figure 11D:
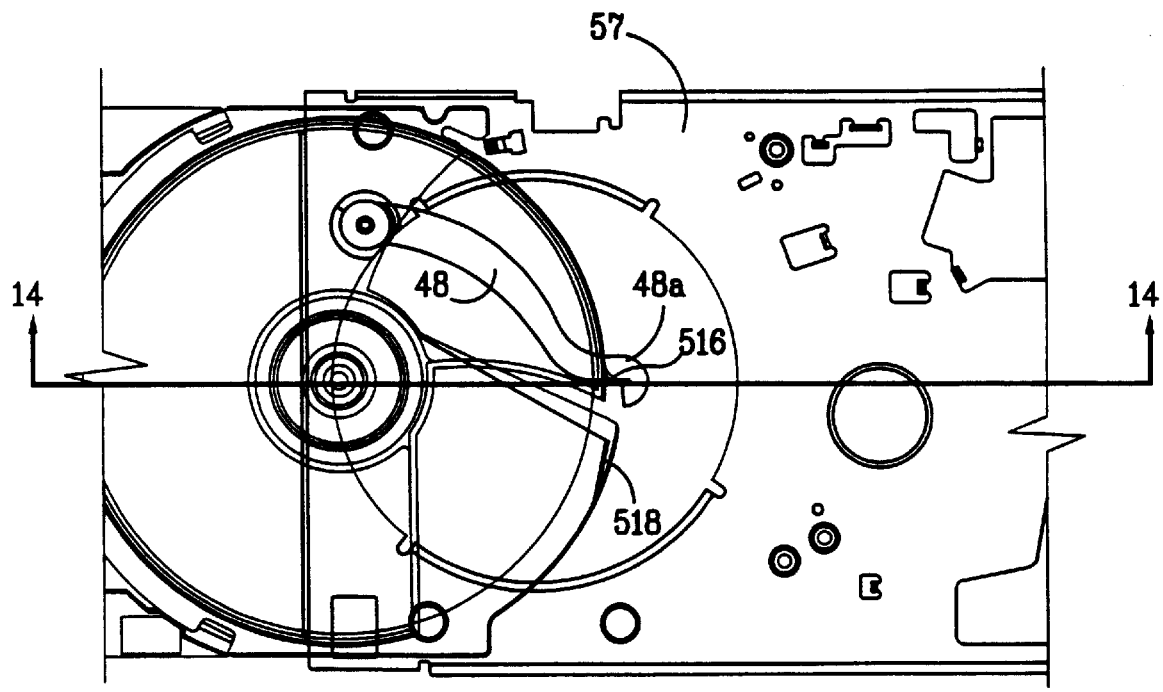
Figure 11E:
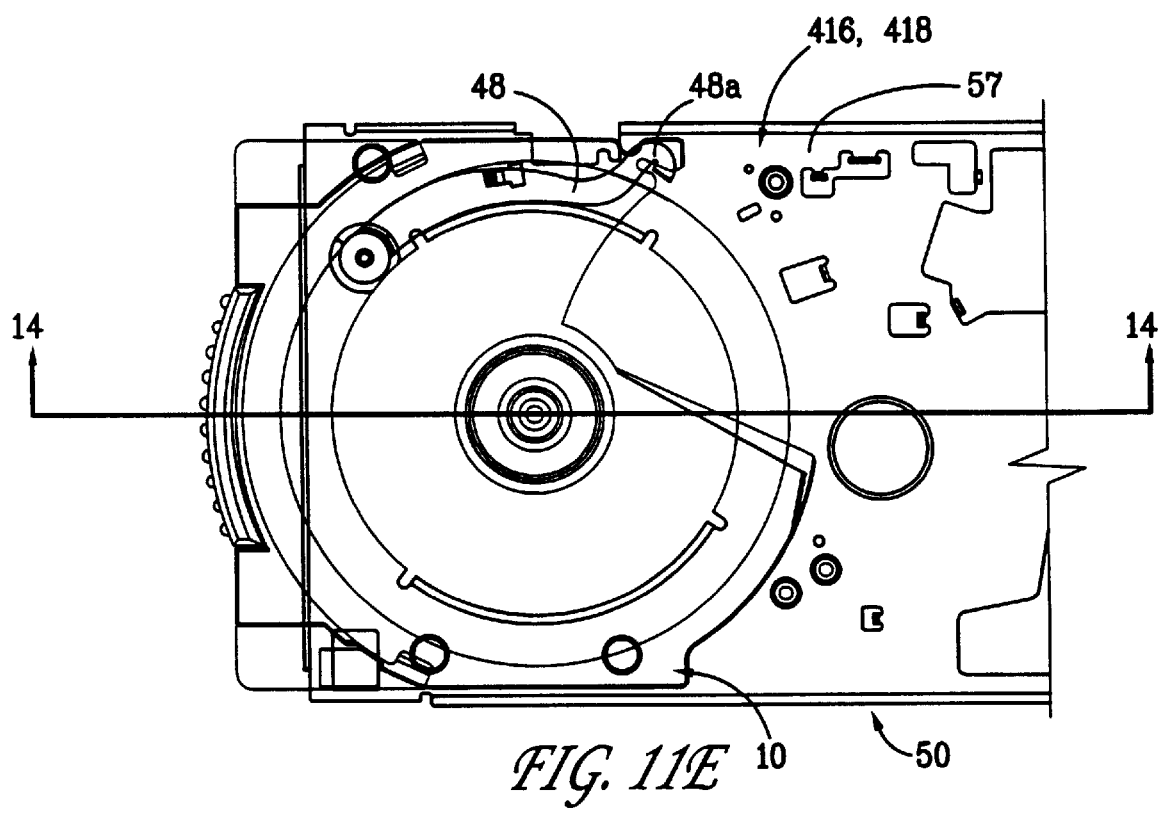

As best illustrated in FIG. 11C, when cartridge 10 is inserted into drive 50, the nose 518 of cartridge 10 engages shutter lever 48. At the point of engagement, hook end 48 of shutter lever 48 mates with catch 516. After the shutter lever 48 has engaged shutter catch 516, the force of insertion (supplied by the user) of cartridge 10 further into drive 50 will cause shutter 16 to rotate in tandem with lever 48 in the counter-clockwise direction. The rotation of lever 48 against the clockwise spring bias loads the spring of lever 48. Similarly, the rotation of shutter 16 against the bias of spring 21 loads shutter spring 21. Accordingly, when cartridge 10 ejects from drive 50, spring 21 causes shutter 16 to snap shut and lever 48 to return to a position proximate the position shown in FIG. 11B. FIG. 11D shows the first stages of shutter 16 rotation as cartridge 10 moves further into drive 50. FIG. 11E shows the complete insertion of cartridge 10.

Shutter 16 and lever 48 disengage in essentially the reverse sequence from that described above in connection with FIGS. 11A–11E. However, the ejection of cartridge 10 from drive 11 is aided by spring 21 of cartridge 10. In particular, as cartridge 10 ejects from drive 50, the force of spring 21 rotates shutter 16 in the clockwise direction. The force of spring 21 causes catch 516 to impinge upon upstanding tab 148. This force also causes cartridge 10 to move outwardly from drive 10. Of course, this force to move the cartridge outwardly diminishes as the shutter lever moves clockwise toward its pre-loaded position. Further details of a disk drive insertion and ejection mechanism are described in co-pending patent application Ser. No. 08/968, 561 entitled "METHOD AND APPARATUS FOR CARTRIDGE EJECTION AND OVERWRITE PROTECTION " filed Nov. 12, 1997, which is hereby incorporated by reference in its entirety.

Figure 12:
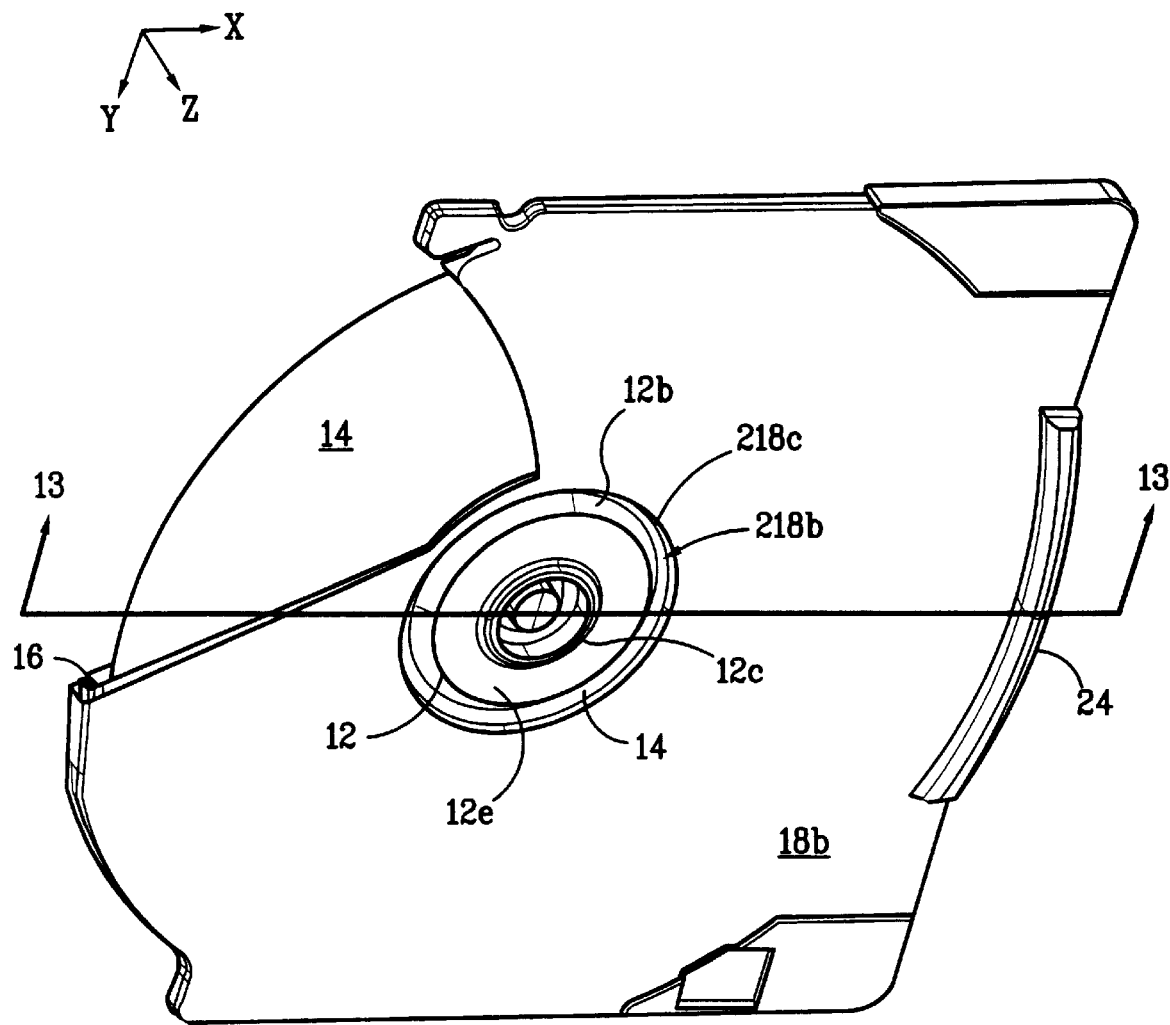
FIG. 12 is a bottom isometric view of the cartridge of FIG. 2 showing the lateral freedom of movement of the hub.

FIG. 12 shows an isometric view of the underside of cartridge 10. Hub 12 is disposed in spindle access hole 218b of cartridge 10. Hub 12 comprises a substantially flat bottom surface 12e, and an inner ring 12c, and an outer peripheral edge 12b. Also shown in FIG. 12, bottom shell half 18b has a rounded edge 218c around drive access hole 218b. Hub 12 and rounded edge 218c interact to restrain lateral movement of disk 14 within cartridge shell 18.

Figure 13:
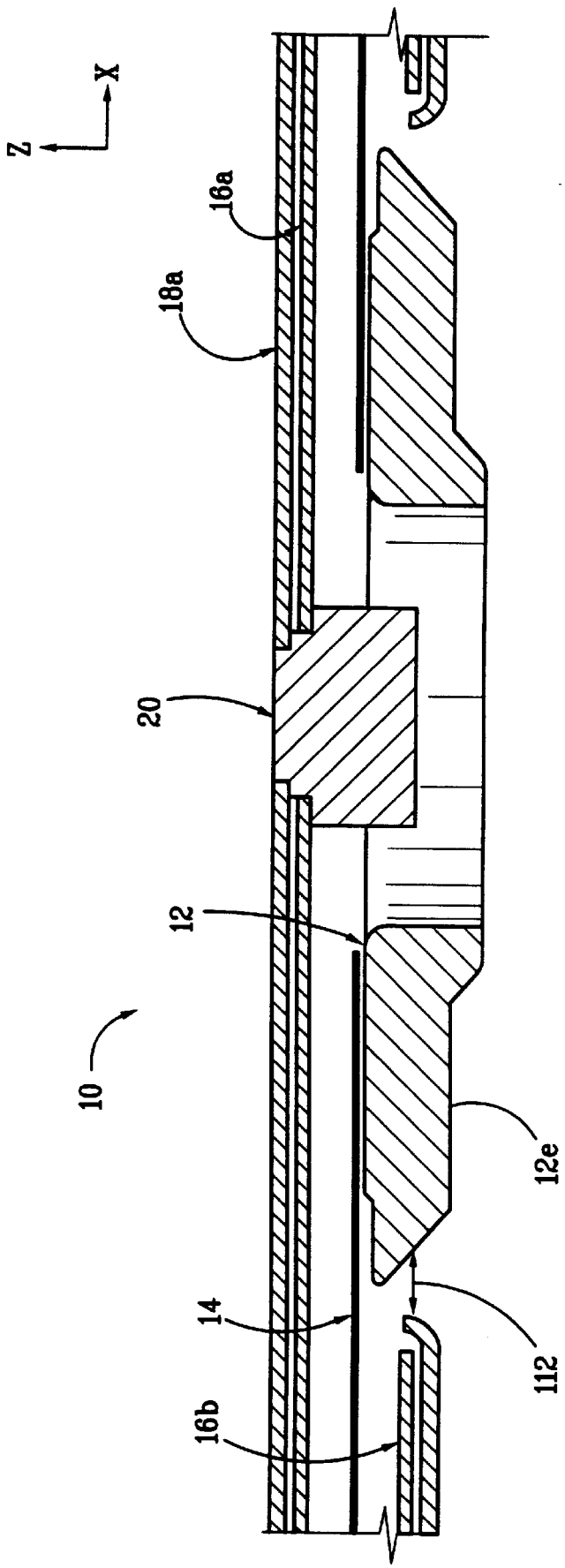
FIG. 13 is a cross section of the disk of FIG. 12 along the lines 13—13.

Unconstrained lateral movement of disk 14 within cartridge 10 could cause the edges of disk 14 to impinge upon the inner circumference of shutter 16. Such impingement could damage disk 14 causing data loss or worse. Referring also to FIG. 13 (a cross section of FIG. 12 along the line 13—13), hub 12 and attached disk 14 are free to move laterally (in the x and y plane) within cartridge 10 by the distance indicated by line 112. However, hub 12 projects outwardly from drive access hole 218b (see also FIG. 6). This projection of hub 12 is much more pronounced than with conventional floppy disk cartridges. The projection is so pronounced that even if hub 12 is pushed up (in the z direction) into cartridge 10, hub 12 still projects out from drive access hole 21 8b. The overall effect of the hub projection is to prevent disk 14 from moving laterally so that its edges contact the inner circumference of shutter 16.

Figure 14A:
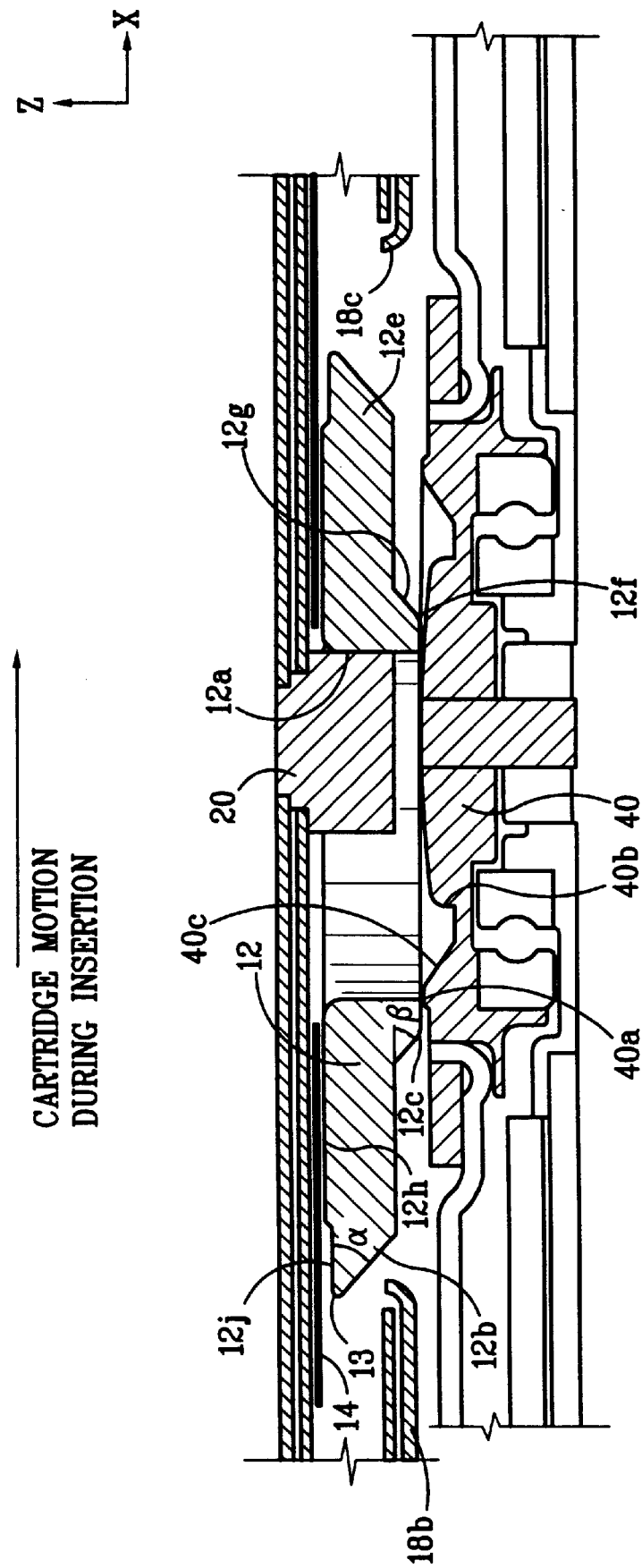
FIGS. 14A–14D show cross sections of the cartridge and drive of FIGS. 11A–11D along the lines 14—14 in various stages of insertion the cartridge into a disk drive.
Figure 14B:
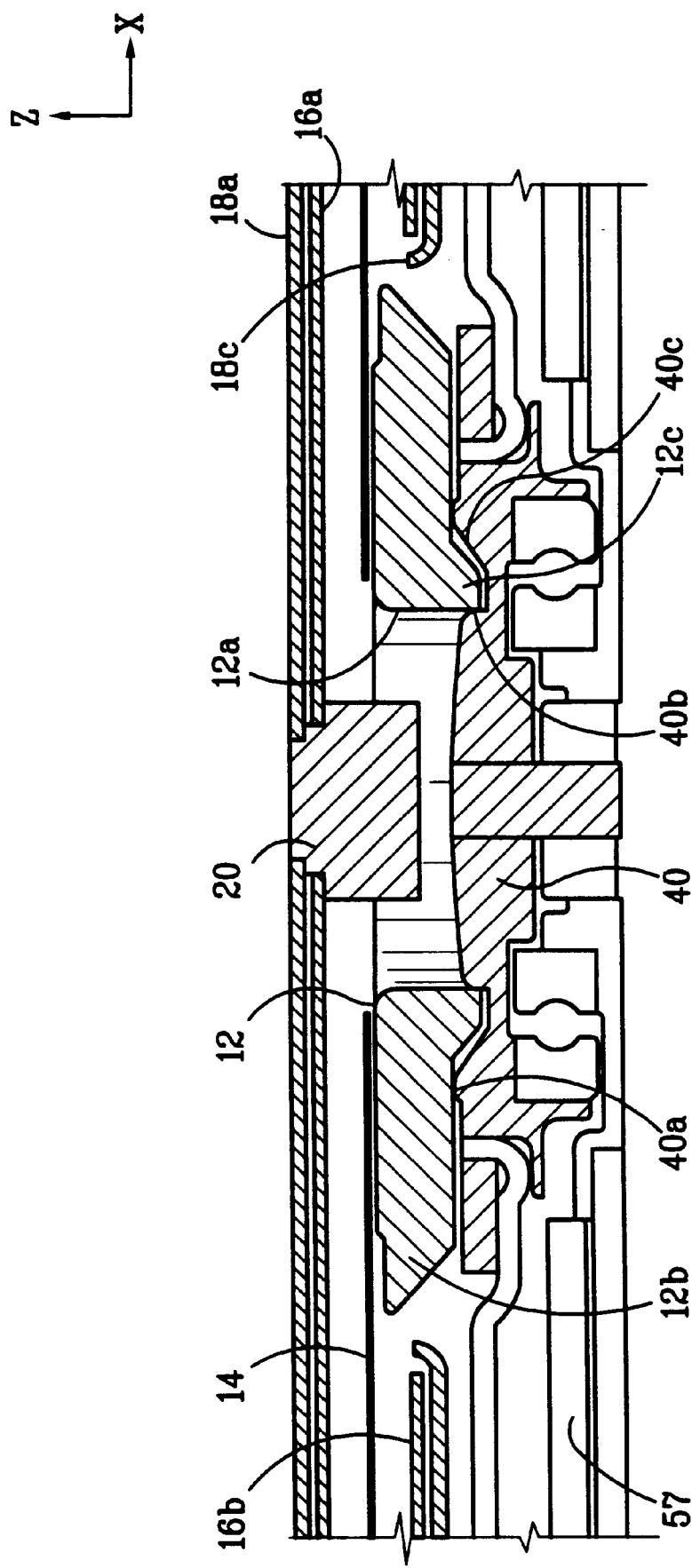
Figure 14C:
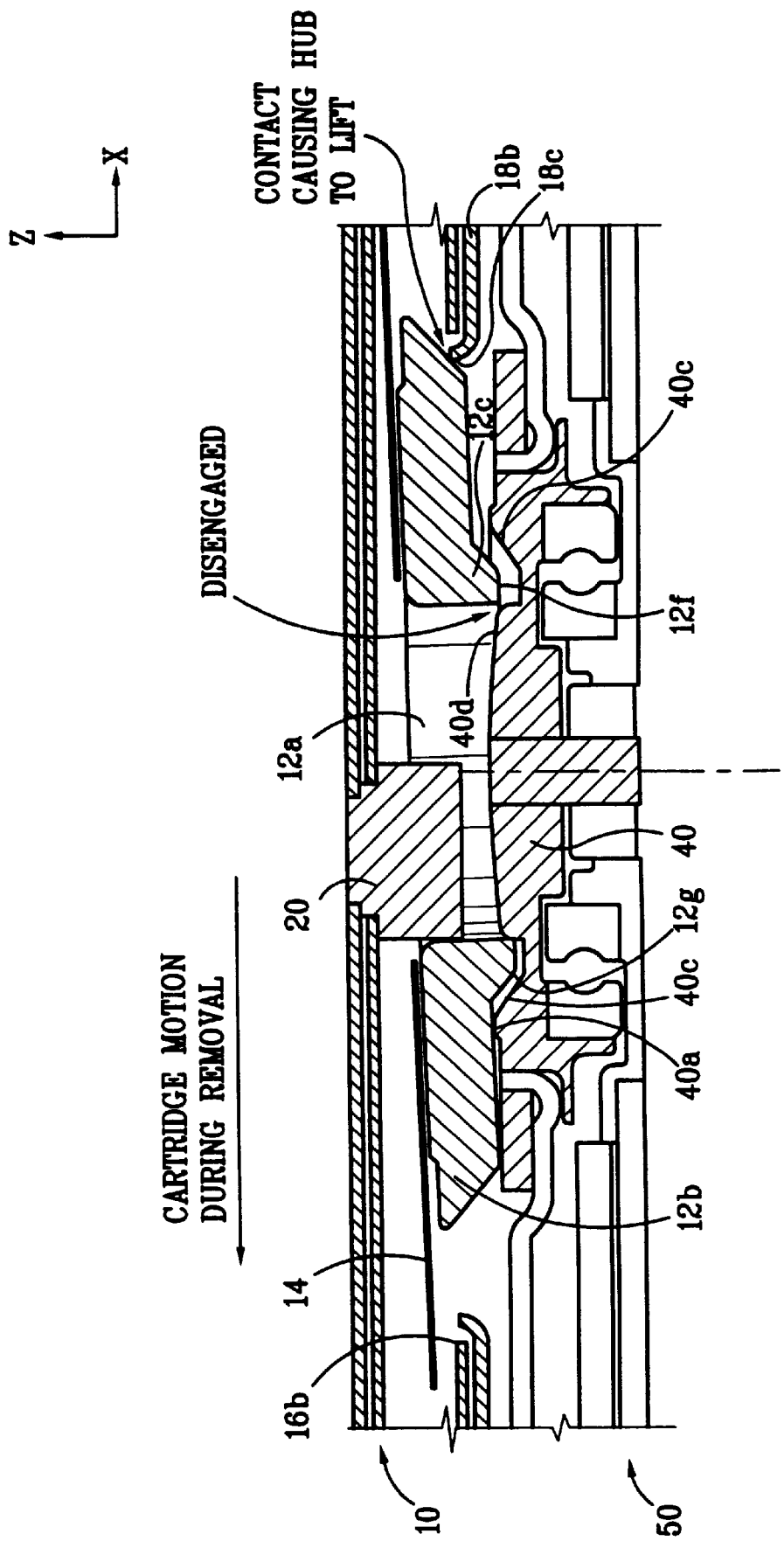

During insertion of cartridge 10 into drive 50, spindle 40 remains fixed and cartridge 10 slides in a fixed plane relative to spindle 40. In other words, unlike typical cartridge insertion mechanisms used in other disk drive systems, in present drive 50 and cartridge 10 there is no translation of either cartridge 10 or 40 in the z-axis. Accordingly, to mount hub 12 to spindle 40, hub 12 undergoes z-axis translation as it slides along the top surface of spindle motor 53 and over spindle 40. This z-axis translation of hub 12 is best illustrated with reference to FIGS. 14A-14C, which present cut-away side views of cartridge 10 and drive 50 that loosely correspond in relative position to cartridge 10 and drive 50 in FIGS. 11, along lines 14—14.

Peripheral edge 12b preferably forms angled outer surface that is adapted to engage with a rounded edge of the spindle access opening during upward translation into shell 18. The preferred angle a for the outer edge is about 45 degrees. More preferably peripheral outer edge 12b substantially forms a ring around the circumference of hub 12. However, other configurations could accomplish a similar function, such as spoke-like or fingers of angled surfaces rather than a solid annular surface depicted in the figure. Similarly, inner ring surface 12c, preferably substantially ring shaped, could also comprises a different form, for example a series of fingers. Inner ring surface 12c also has a preferred angle, β, of about 45 degrees.

As shown by the cut-away side views, hub 12 has a stepped side profile. Disk 14 is attached to the hub along a topmost surface 12h of hub 12. A step down from top surface 12h is a surface 12j, which forms the top of peripheral outer edge 12b. The step provides a gap 13 between the hub 12 and disk 14. As is described more fully below, gap 13 provides additional flexibility for vertical translation of hub 12 within cartridge 10.

Spindle motor 40 has several features that are adapted to interact with hub 12. In particular, spindle 40 includes the "z" datum 40a (provided by a raised ring), a round boss surface 40b and a conical lead-in groove 40c. All of these features cooperate to enable engagement and disengagement of hub 12 from spindle 40. In addition, the top of spindle 40 is magnetically sensitized to attract and magnetically couple hub 12 to spindle 40.

Significantly, hub 12 engagement and disengagement from spindle 40 occurs without translating the plane of cartridge 10 vertically (i.e. in the z-axis direction) relative to the plane of the drive or without translating the spindle motor. Consequently, the height of drive 10 can be thinner than is possible in either a spindle or cartridge translation method. Instead of translating either the spindle or the cartridge, hub 12 and media 14 are translated along the z-axis within shell 18 as the cartridge is translated linearly (i.e., along a plane substantially parallel to the x-axis) into and out of drive 50. No additional space is required within cartridge shell 18 to accommodate the z-axis translation of hub 12, other than space which is already available to allow disk 14 to spin freely within shell 18. The present invention can even function properly with less interior cartridge space than that provided in a common 3.5 inch disk cartridge.

During insertion of cartridge 10 into drive 50, as depicted in FIG. 4A, hub 12 slides on inner ring surface 12c over the relatively planar profile of the bottom of chassis 57 and over the top of spindle 40. The ring surface provided by inner ring 12c provides a relatively large surface area for hub 12 to slide upon during insertion into drive 50. This large surface area ensures that the hub slides smoothly into drive 50. Downwardly projecting pin 20 is coupled proximate the center of cartridge 10 to top shell portion 18a. The downwardly projecting pin 20, engages sidewall 12a of hub 20 urging it into chassis 57.

A force applied to cartridge 10 during insertion causes pin 20 to push against the sidewall of bore 12a. This pushing provides a force to overcome the friction between inner ring surface 12c and chassis 57 and top of spindle 40. As cartridge 10 reaches far enough into drive 50, inner ring surface 12c aligns with conical lead-in groove 40c. At that point, the magnetic force provided by spindle 40 attracts and pulls hub 12 into engagement with spindle 40, resulting in inner ring surface 12c extending into conical lead-in groove 40c. As best shown in FIG. 4B, the angles of lead-in groove 40c and inner ring surface 12c, preferably proximately 45 degrees, are such that hub 12 properly aligns on center with spindle 40 as hub 12 is pulled into a seated position. In particular, inner ring 12c forms a cone-like male surface that corresponds with the cone-like female opening of lead-in groove 40c. As the two cone-like surfaces engage, inner ring 12c is guided by conical lead-in groove 40c. Moreover, the relatively large diameter of inner ring surface 12c (as measured across hub 12) and conical lead-in groove 40c ensures a highly accurate alignment of hub 12 to spindle 40.

As cartridge 10 ejects from drive 50, hub 12 disengages from spindle 40, again, without vertical translation of cartridge 10 with respect to drive 50 (only hub 12 and media 14 translate in the z-axis). As best shown in FIG. 4C, when cartridge 10 starts ejection from drive 50, cartridge shell 18 moves outwardly from drive 50. During this outward movement of cartridge shell 18, hub 12 initially remains seated on spindle 40. A force is required to cause disengagement of hub 12. The required force is provided by the movement of cartridge shell 18 relative to hub 12. Cartridge shell 18 has downwardly projecting pin 20 and rounded edge 18c that cooperate with hub 12 to facilitate disengagement.

Disengagement begins when pin 20 impinges on the sidewall of bore 12a. Substantially simultaneously, rounded edge portion 18c contacts the angled peripheral outer edge 12b. As shell 18 continues to move outwardly, rounded edge 18c slides against angled peripheral edge 12b. The horizontal movement (along the x-axis) of rounded edge 18c relative to angled edge peripheral edge 12b urges a lifting hub 12. The combined impingement of pin 20 and lifting of shell 18b cause hub 12 to tilt about datum 40a. As hub 12 tilts, inner ring surface 12c also tilts. When the bottom surface 12f of inner ring 12c clears the top 40d of spindle 40 hub 12 can also move begin moving outwardly with cartridge 10. As hub 12 moves outwardly, angled inner ring surface 12g engages angled spindle lead-in groove surface 40c. Because both surface are angled, hub 12 slides up the side of lead-in groove surface 40c.

Figure 14D:
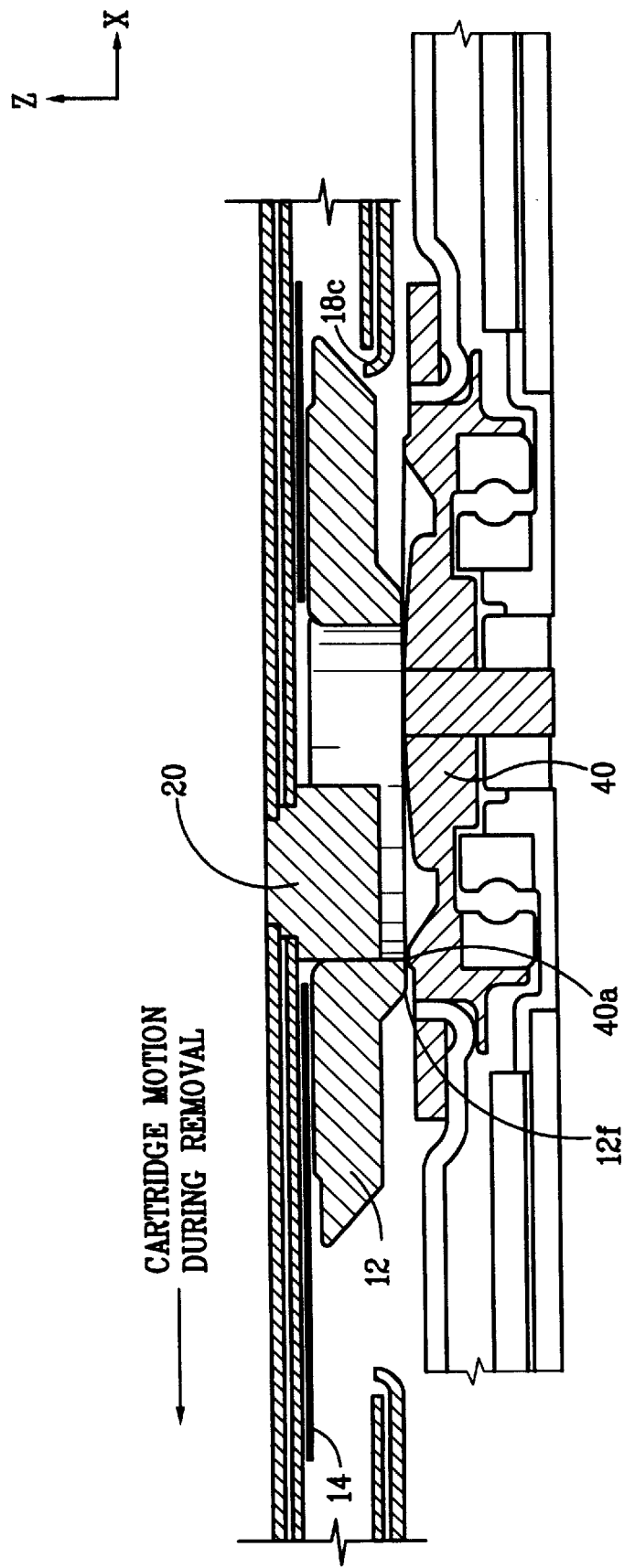

As best shown in FIG. 14D, when bottom surface 12f of inner ring 12c clear datum 40a of spindle 40, hub 12 is free to move with cartridge 10. Thereafter, pin 20 urges hub 12 to travel in tandem with cartridge shell 18. The force of pin 20 continues to drag hub 12 over the surface of spindle motor 53 and chassis 57 until cartridge 10 has ejected from drive 50.

The stepped profile of hub 12 allows for additional headroom as hub 12 tilts within cartridge 10. That is, without a stepped hub, the tilting could cause the top of hub 12 to impinge upon the inner top surface of shell 18a and interfere with the disengagement of hub 12 from spindle 40. Moreover, the stepped hub allows the disk 14 to flex as hub 12 is tilted during disengagement.

A best illustrated in 14A, hub 12 is translated in the z-axis direction during cartridge 10 insertion into drive 50. As a result, disk 14 is push upward to the inner surface of upper shutter shell 16a an against liner 15a (not shown in this Figure for clarity). This upward translation of hub 12 allows it to clear the top of spindle 40.

However, as a side effect of the upward location of disk 14, the edge of disk 14 must be adjusted downwardly to thread the head loading ramps 47 as described more fully below.

Figure 15A:
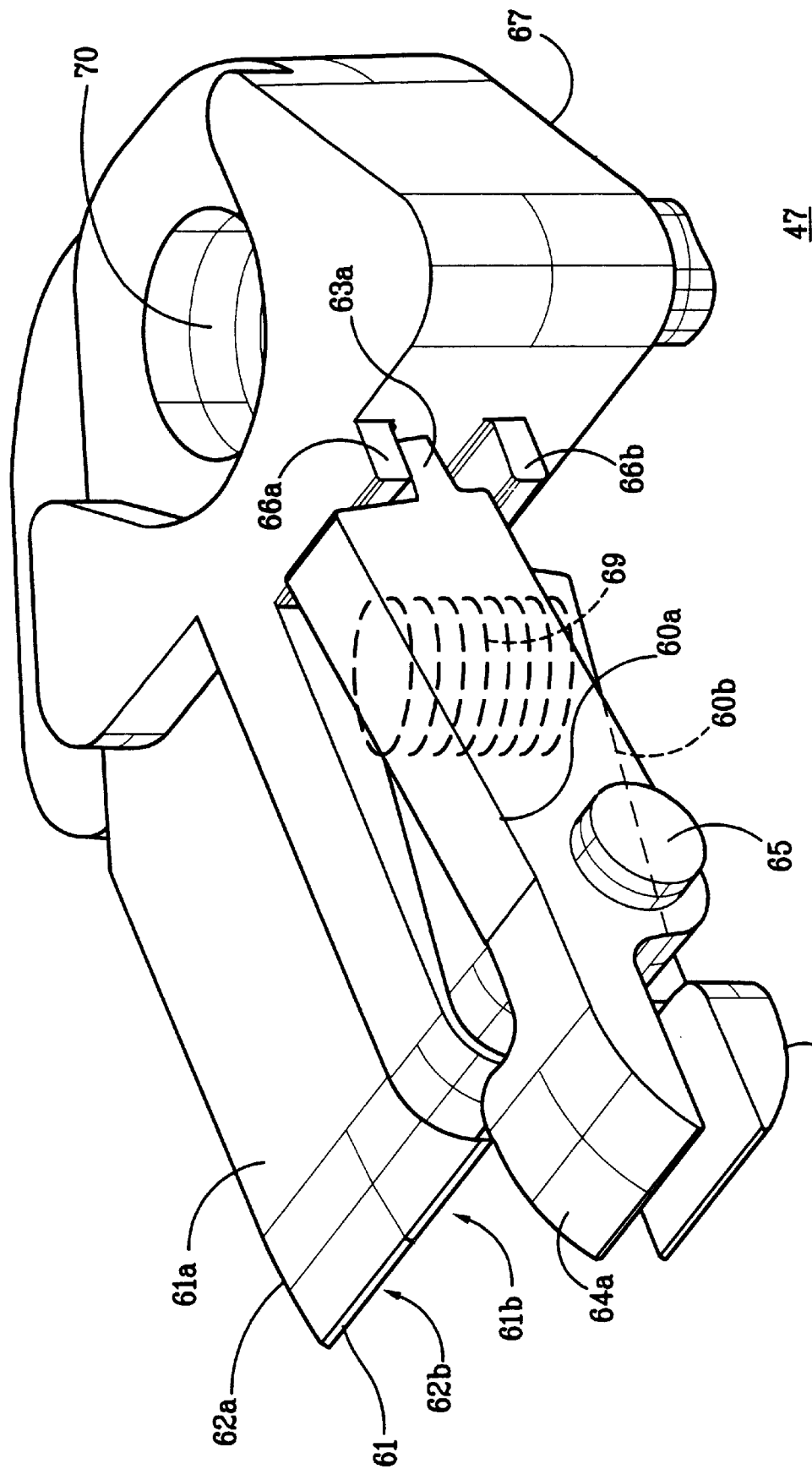
FIG. 15A shows an isometric view of the load ramp of the present invention.

FIG. 15A shows an isometric view of the load ramp in accordance with the present invention. Load ramp 47 comprises a base 67, head guard 61, pivoting arms 60a and 60b, abutments 66a and 66b, pivot pin 65, and compression spring 69. Each arm 60a, 60b comprises a ramped end portion 64a, 64b and a tail portion 63a, 63b. Pivoting arms 60a and 60b are arranged to pivot about pivot pin 65 in opposing fashion between an open position, in which the ramped ends pivot away from each other, and a closed position in which the ramped ends pivot toward each other. Spring 69 is disposed between the arms 60a and 60b such that the arms 60a and 60b are biased toward the closed position. Tail portions 63a and 63b of arms 60a and 60b, respectively, engage the corresponding abutments 66a and 66b to restrain the rotational travel of arms 60a and 60b when they are biased toward the closed position. Base 67 also comprises a hole 70 for attachment to the drive chassis 57 by means of a screw or other common attachment means. Head guard 61 extends out from the base 67 and provides opposing surfaces 61a and 61b. Each surface 61a and 61b has a ramped front portion 62a and 62b, respectively. Each of these surfaces 61a and 61b provides a surface for heads 54 to rest when the actuator 56 is in the parked position.

Figure 15B:
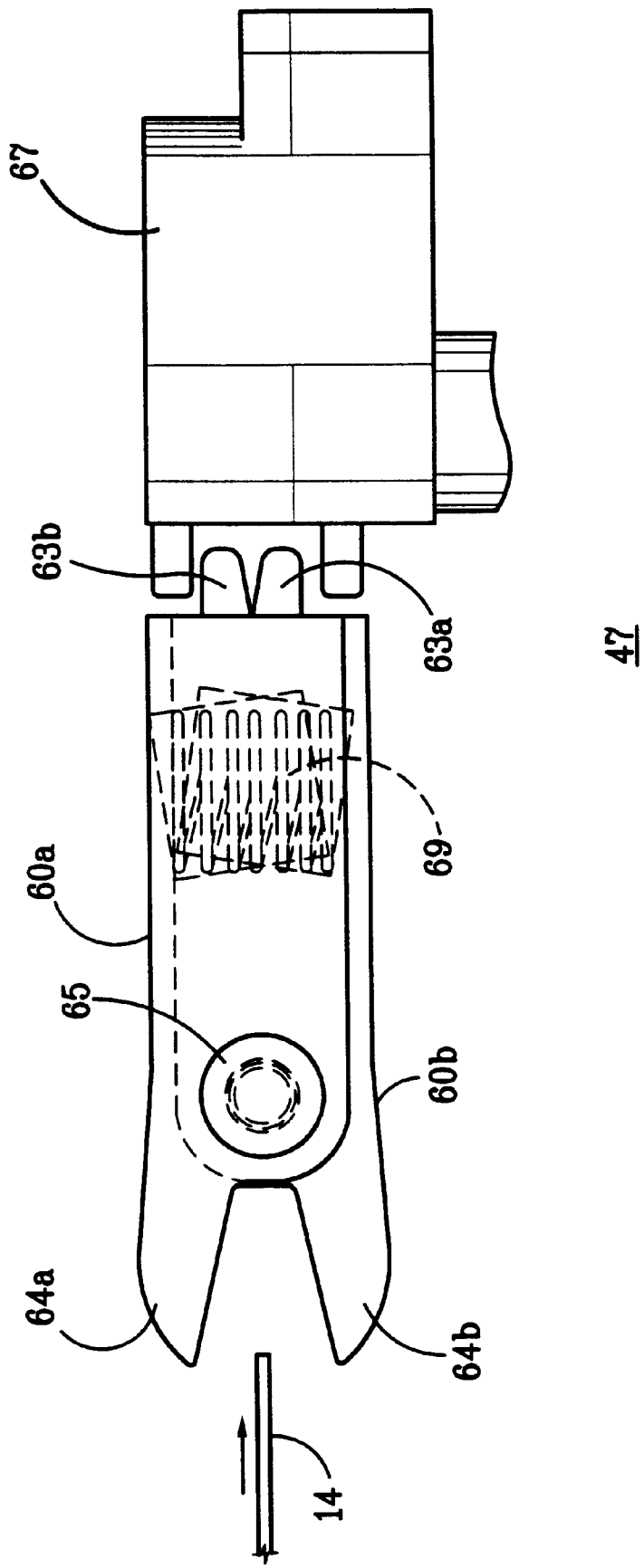
FIG. 15B shows the arms opened during media insertion to prevent damage to the media.
Figure 15D:
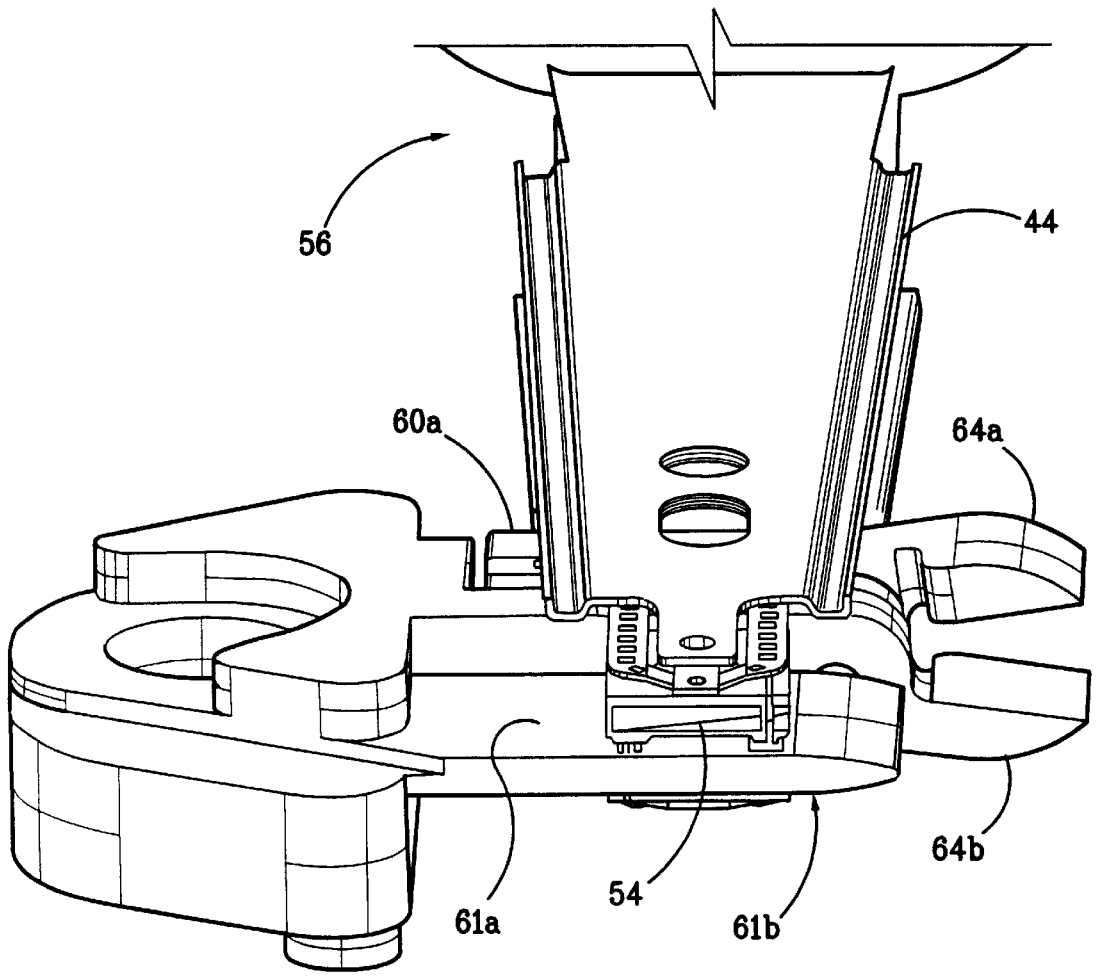
FIG. 15D shows the heads loaded onto the load ramp and compressing a bias spring.

Referring now to FIG. 15B and 15C, side views of load ramp 47 are shown. In FIG. 15B, pivot arms 60a and 60b are in the open position, with spring 69 compressed (by load beams 44, which are not shown for clarity). Accordingly, the distance between ramped end portions 64a and 64b is maximized. With the distance thus maximized, media 14 entering between the end portions 64a and 64b has sufficient space to fluctuate during loading without a collision between media 14 and load ramp 47. In FIG. 15C, the pivot arms 60a and 60b are in the closed position. Once the media is fully inserted into drive 50, pivoting arms 60a and 60b can safely close over media 14 without damage to media 14. With arms 60a and 60b in the closed position, heads 54 can safely move between media 14 and load ramps 47.

Because hub 12 and disk 14 are translated upwardly from hub 12 sliding over chassis 57, when hub 12 is compressed into liner 15a, disk 14 is forced out of plane. Forcing disk 14 out of plane in this way causes a large distortion at outer peripheral edges of disk 14. The edge distortion, in turn, could cause disk 14 to travel over the top of load ramp end portions 64a, 64b rather than properly threading between end portions 64a, 64b. An adjustment to the disk 14 at the disk access opening is necessary to ensure that disk 14 properly threads between load ramps end portions 64a and 64b.

Figure 16:
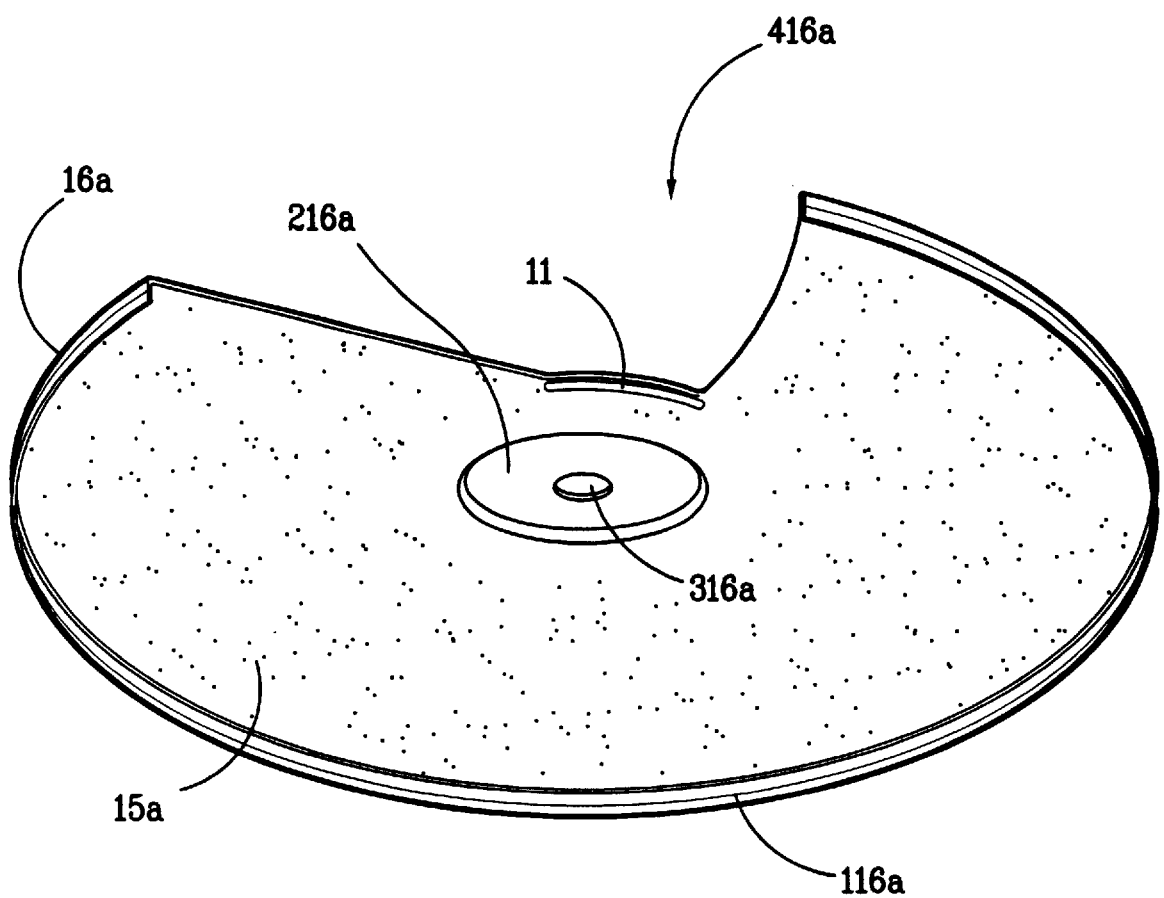
FIG. 16 is an isometric view of the interior of a shutter shell and liner assembly showing the relative location of a media distortion neutralizer.

Accordingly, referring now to FIG. 16, an isometric bottom view of upper shutter shell half 16a with attached liner 15a is shown. Liner 15a is attached to the inner surface 216a of shutter half 16a. Liner 15a is cut around post hole 316a exposing a portion of inner surface 16a (about the size of drive access hole 316b ). Distortion neutralizer 11 is disposed on surface 216a of shutter half 216a proximate the apex of wedge-shaped disk access opening 416a. (See also FIG. 7). Media distortion neutralizer 11 comprises a raised surface on inner surface 216a. The raised surface can be formed by attaching material to surface 216a. The thickness of the distortion neutralizer is at least one thickness of liner 15a and no thicker than about half the thickness of the space between shutter shell halves 16. Most preferably, it is about 0.2 mm thick. The width of distortion neutralizer 11 is limited by the relatively small size of the present cartridge 10. That said, it is further limited by the distance between the edge of disk access opening 416a and hub 12. Accordingly, the width is between about 1 and 2 mm, preferably about 1.5 mm. Preferably, the raised surface is formed by stamping the distortion neutralizer directly into upper shell half 16a. Moreover, shell liner 15a is preferably attached over the top of the raised surface to protect disk 14 from direct metal contact on media distortion neutralizer 11. Media distortion neutralizer 11 is preferably arced, more preferably the arc is a portion of a circle so as to be concentric with disk 14; however, it could also be substantially straight. Thus, when cartridge 10 is assembled, media distortion neutralizer provides a ridge of material projecting downwardly from an upper surface of cartridge 10. This projecting surface ensures that disk 14 is forced downwardly toward the a plane proximately more centered between upper and lower cartridge halves 18a, 18b. The more centered disk 14, therefore, more reliably threads between head load ramp ends 64a, 64b during cartridge insertion into drive 50.

The above description of preferred embodiments is not intended to impliedly limit the scope of protection of the following claims. Thus, for example, except where they are expressly so limited, the following claims are n-t limited to applications involving cartridges for disk drive systems.

What is claimed is:

1. A cartridge for use in a removable media disk drive having a spindle for coupling with said cartridge, said cartridge comprising:

an outer shell having a first spindle access opening and a first head access opening, said first head access opening being disposed in a front portion of said outer shell and contiguously along top, front, and bottom sides of the outer shell;

an inner shell having a second spindle access opening and a second head access opening, said second head access opening disposed in a front portion of said inner shell and contiguously along top, front, and bottom sides of the inner shell, said inner shell being rotatably coupled to said outer shell between first and second positions, and wherein said spindle access openings are substantially aligned, said inner shell being selectively rotatable to said first position such that said head access openings substantially align and said second position such that said head access openings are substantially misaligned;

a substantially circular magnetic medium rotatably disposed within said inner shell such that said inner shell encloses at least half of said magnetic medium.

2. The cartridge as recited in claim 1 wherein said inner shell comprises upper and lower inner shell halves having raised outer edges, wherein said edges overlap in frictional engagement to form a single inner shell.

3. The cartridge as recited in claim 1 wherein said inner shell is substantially disc-shaped and has a hollow interior wherein said magnetic medium is rotatably disposed.

4. The cartridge of claim 1 wherein said inner shell comprises a sheet metal.

5. The cartridge as recited in claim 4 wherein said sheet metal is aluminum.

6. The cartridge as recited in claim 1 wherein said head access openings in at least one of said outer shell and said inner shell are substantially wedge-shaped.

* * * * *

UNITED STATES PATENT AND TRADEMARK OFFICE
CERTIFICATE OF CORRECTION

PATENT NO. : 6,005,755
DATED : December 21, 1999
INVENTOR(S) : Jay Muse, Brian Schick and Shane Nowell It is certified that error appears in the above-identified patent and that said Letters Patent is hereby corrected as shown below:

Col. 5, line 4, after "length" insert --$\ell$--

Col. 6, line 39, change "comers" to -corners-.

Col. 6, line 65, after "radius" should be the symbol --$\sim$--.

Col. 8, line 31, "an" should be -and-.

Col. 10, line 36, "a" should be -$\alpha$-.

Col. 12, line 21, "an" should be -and-.

Col. 14, line 4, "n-t" should be -not-.

Signed and Sealed this

Twenty-ninth Day of August, 2000

Attest:

Q. TODD DICKINSON

*Attesting Officer*    *Director of Patents and Trademarks*